(12) United States Patent
Wu et al.

(10) Patent No.: US 12,448,443 B2
(45) Date of Patent: Oct. 21, 2025

(54) CS1 ANTIBODY AND ANTI-CS1-CAR-T CELLS

(71) Applicants: ProMab Biotechnologies, Inc., Richmond, CA (US); Forevertek Biotechnology Co., Ltd, Changsha (CN)

(72) Inventors: Lijun Wu, Albany, CA (US); Vita Golubovskaya, Richmond, CA (US)

(73) Assignees: ProMab Biotechnologies, Inc., Richmond, CA (US); Forevertek Biotechnology Co., Ltd, Changsha (CN)

( * ) Notice: Subject to any disclaimer, the term of this patent is extended or adjusted under 35 U.S.C. 154(b) by 907 days.

(21) Appl. No.: 17/652,180

(22) Filed: Feb. 23, 2022

(65) Prior Publication Data

US 2022/0220201 A1  Jul. 14, 2022

Related U.S. Application Data

(63) Continuation of application No. PCT/US2020/048542, filed on Aug. 28, 2020.

(60) Provisional application No. 62/895,803, filed on Sep. 4, 2019.

(51) Int. Cl.
| | |
|---|---|
| *C07K 16/28* | (2006.01) |
| *A61K 40/11* | (2025.01) |
| *A61K 40/31* | (2025.01) |
| *A61K 40/42* | (2025.01) |
| *A61P 35/00* | (2006.01) |
| *C07K 14/705* | (2006.01) |
| *C07K 14/725* | (2006.01) |
| *C12N 15/63* | (2006.01) |

(52) U.S. Cl.
CPC .......... *C07K 16/2803* (2013.01); *A61K 40/11* (2025.01); *A61K 40/31* (2025.01); *A61K 40/4202* (2025.01); *C07K 14/7051* (2013.01); *C07K 14/70596* (2013.01); *A61K 2239/28* (2023.05); *A61K 2239/31* (2023.05); *A61K 2239/46* (2023.05); *A61P 35/00* (2018.01); *C07K 2317/622* (2013.01); *C07K 2319/03* (2013.01); *C12N 15/63* (2013.01)

(58) Field of Classification Search
CPC ............ C07K 16/2803; C07K 14/7051; C07K 14/70596; C07K 2317/622; C07K 2319/03; C07K 16/32; A61K 40/11; A61K 40/31; A61K 40/4202; A61K 2239/28; A61K 2239/31; A61K 2239/46; A61P 35/00; C12N 15/63
See application file for complete search history.

(56) References Cited

U.S. PATENT DOCUMENTS

| | | | |
|---|---|---|---|
| 10,077,309 B2* | 9/2018 | Chroneos | ................ A61P 31/16 |
| 12,060,425 B2* | 8/2024 | Wu | .................... C07K 16/2803 |
| 2011/0206701 A1 | 8/2011 | Afar et al. | |
| 2014/0363455 A1 | 12/2014 | Stull et al. | |
| 2019/0185569 A1 | 6/2019 | Li et al. | |

OTHER PUBLICATIONS

International Search Report for PCT Application No. PCT/US2020/048542. Mail Date: Dec. 9, 2020. 1 page.

* cited by examiner

*Primary Examiner* — Janet L Epps-Smith
*Assistant Examiner* — Kathleen CunningChen
(74) *Attorney, Agent, or Firm* — Perkins Coie LLP; Viola Kung

(57) ABSTRACT

The present invention is directed to a monoclonal anti-human CS1 antibody or a single-chain variable fragment (scFv), comprising VH having the amino acid of SEQ ID NO: 3 and VL having the amino acid of SEQ ID NO: 7. The present invention is also directed to a chimeric antigen receptor fusion protein comprising from N-terminus to C-terminus: (i) a single-chain variable fragment (scFv) of the present invention, (ii) a transmembrane domain, (iii) at least one co-stimulatory domains, and (iv) an activating domain.

12 Claims, 11 Drawing Sheets

Specification includes a Sequence Listing.

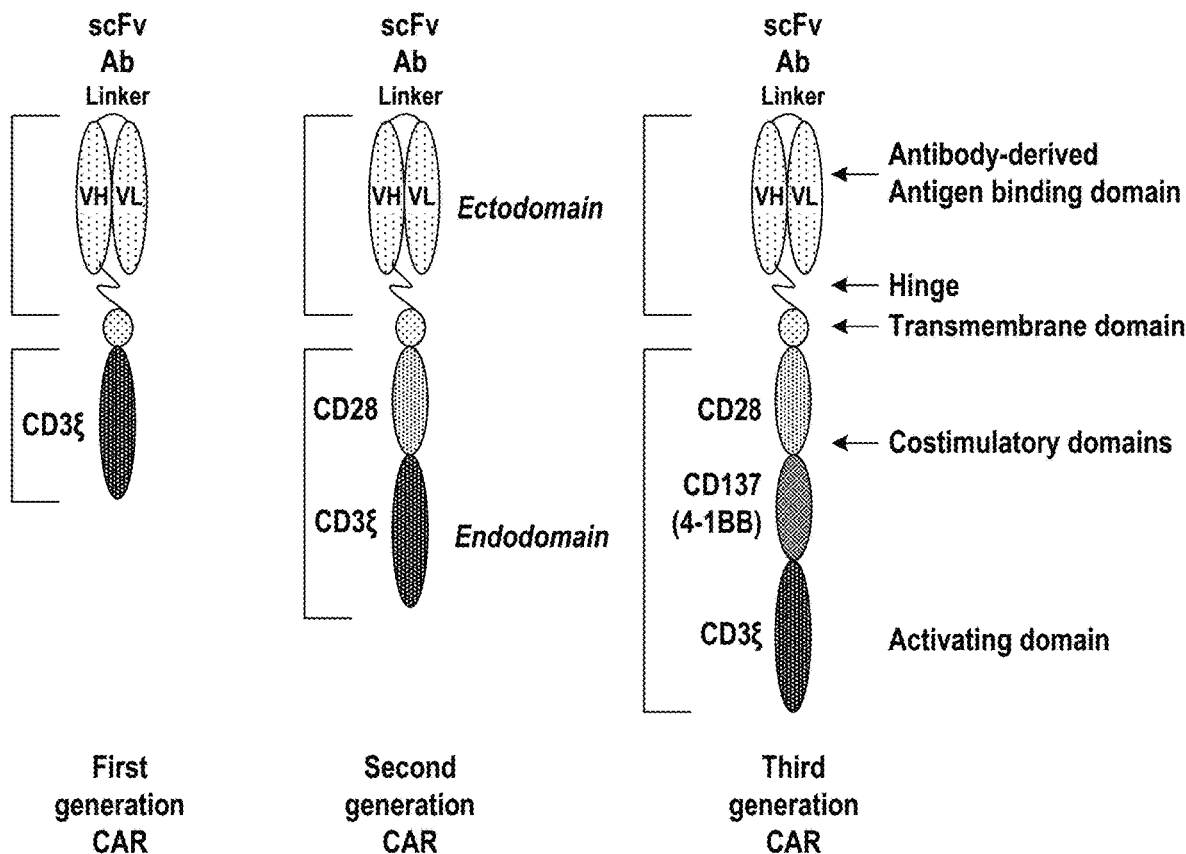

FIG. 1

```
          10         20         30         40         50
MAGSPTCLTL IYILWQLTGS AASGPVKELV GSVGGAVTFP LKSKVKQVDS
          60         70         80         90        100
IVWTFNTTPL VTIQPEGGTI IVTQNRNRER VDFPDGGYSL KLSKLKKNDS
         110        120        130        140        150
GIYYVGIYSS SLQQPSTQEY VLHVYEHLSK PKVTMGLQSN KNGTCVTNLT
         160        170        180        190        200
CCMEHGEEDV IYTWKALGQA ANESHNGSIL PISWRWGESD MTFICVARNP
         210        220        230        240        250
VSRNFSSPIL ARKLCEGAAD DPDSSMVLLC LLLVPLLLSL FVLGLFLWFL
         260        270        280        290        300
KRERQEEYIE EKKRVDICRE TPNICPHSGE NTEYDTIPHT NRTILKEDPA
         310        320        330
NTVYSTVEIP KKMENPHSLL TMPDTPRLFA YENVI
```

FIG. 2

CS1 ANTIBODY AND ANTI-CS1-CAR-T CELLS

This application is a continuation of PCT/US2020/048542, filed Aug. 28, 2020; which claims the priority of U.S. Provisional Application No. 62/895,803, filed Sep. 4, 2019. The contents of the above-identified applications are incorporated herein by reference in their entireties.

REFERENCE TO SEQUENCE LISTING, TABLE OR COMPUTER PROGRAM

The Sequence Listing is concurrently submitted herewith with the specification as an ASCII formatted text file via EFS-Web with a file name of Sequence Listing.txt with a creation date of Aug. 26, 2020, and a size of 25.7 kilobytes. The Sequence Listing filed via EFS-Web is part of the specification and is hereby incorporated in its entirety by reference herein.

FIELD OF THE INVENTION

The present invention relates to CS1-specific antibody (clone 5G584) and anti-CS1-CAR-T cells, which are useful in the field of adoptive immunity gene therapy for tumors.

BACKGROUND OF THE INVENTION

Immunotherapy is emerging as a highly promising approach for the treatment of cancer. T cells or T lymphocytes, the armed forces of our immune system, constantly look for foreign antigens and discriminate abnormal (cancer or infected cells) from normal cells. Genetically modifying T cells with CAR (Chimeric antigen receptor) constructs is the most common approach to design tumor-specific T cells. CAR-T cells targeting tumor-associated antigens (TAA) can be infused into patients (called adoptive cell transfer or ACT) representing an efficient immunotherapy approach [1, 2]. The advantage of CAR-T technology compared with chemotherapy or antibody is that reprogrammed engineered T cells can proliferate and persist in the patient ("a living drug") [1, 3].

CARS typically consist of a monoclonal antibody-derived single-chain variable fragment (scFv) at the N-terminal part, hinge, transmembrane domain and a number of intracellular co-activation domains: (i) CD28, (ii) CD137 (4-1BB), CD27, or other co-stimulatory domains, in tandem with an activation CD3-zeta domain. (FIG. 1) [1,2]. The evolution of CARs went from first generation (with no co-stimulation domains) to second generation (with one co-stimulation domain) to third generation CAR (with several co-stimulation domains). Generating CARs with two costimulatory domains (the so-called 3rd generation CAR) have led to increased cytolytic CAR-T cell activity, improved persistence of CAR-T cells leading to its augmented antitumor activity.

FIG. 1 illustrates the structures of CAR. The left panel shows the structure of the first generation of CAR (no costimulatory domains). The middle panel shows the structure of the second generation of CAR (one co-stimulation domain CD28 or 4-BB). The right panel shows the third generation of CAR (two or several co-stimulation domains) [4].

CS1 Antigen.

CS1 (SLAM family member 7, CD319) antigen is overexpressed in multiple myeloma cells. The extracellular domain (23-226 amino-acids) is shown in FIG. 2 underlined in bold font). Based on high expression of CS1 in multiple myeloma it was used as a target with CS1 antibodies or CAR-T cells. FIG. 2 shows the amino-acid sequence of CS1 protein.

BRIEF DESCRIPTION OF THE DRAWINGS

FIG. 1 shows the structures of CAR.

FIG. 2 shows the amino acid sequence of CS1 protein (SEQ ID NO: 1). The extracellular domain is underlined and in bold.

Figure 13A:
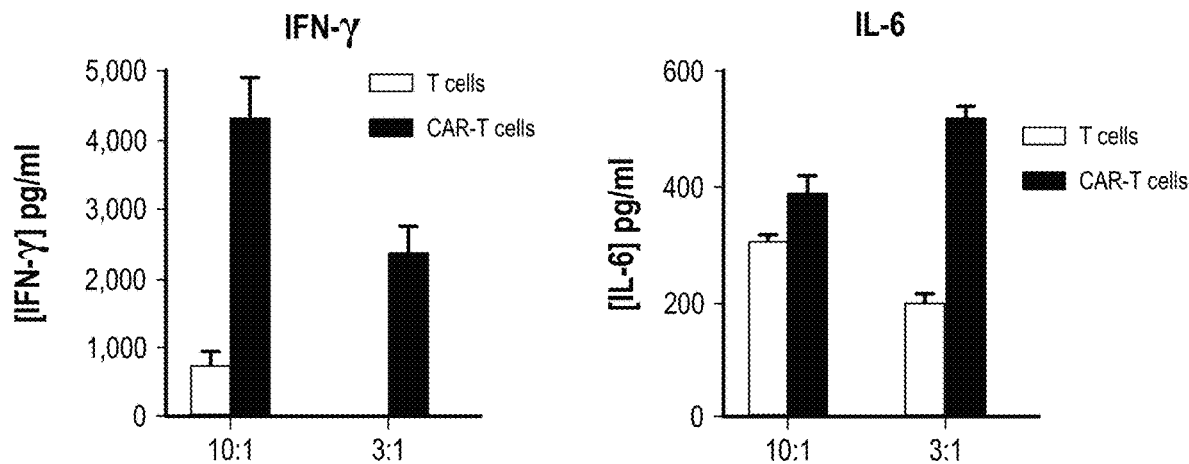
Figure 13B:
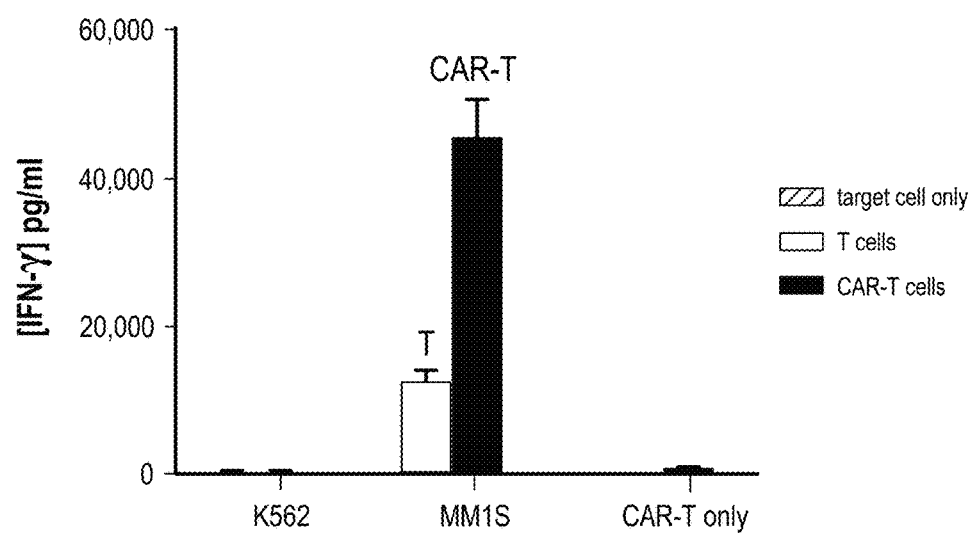

FIG. 13A shows the cytokine production of CS1-41BB-CD3-CAR-T cells (PMC713) in response to HeLa-CS1 cells. Medium was collected from the RTCA wells, it was centrifuged to remove cells and analyzed by ELISA for the levels of IFN-γ, and IL-6. The p values for CAR-T cells vs T cells are 0.0002 for IFN-γ at 10:1, 0.0034 for IFN-γ at 3:1, 0.038 for IL-6 at 10:1 and <0.0001 for IL-6 at 3:1 (2-way ANOVA with Sidak's post-hoc test). FIG. 13B shows the IFN-γ production by PMC713 CS1-41BB-CD3 CAR-T cells in response to myeloma cells. Medium was collected from the cultures, centrifuged to remove cells and analyzed by ELISA for the levels of IFN-γ. The average of two replicates is shown. The p value for CAR-T cells vs T cells is 0.0006 for MM1S cells by 2-way ANOVA with Sidak's post-hoc test.

Figure 14A:
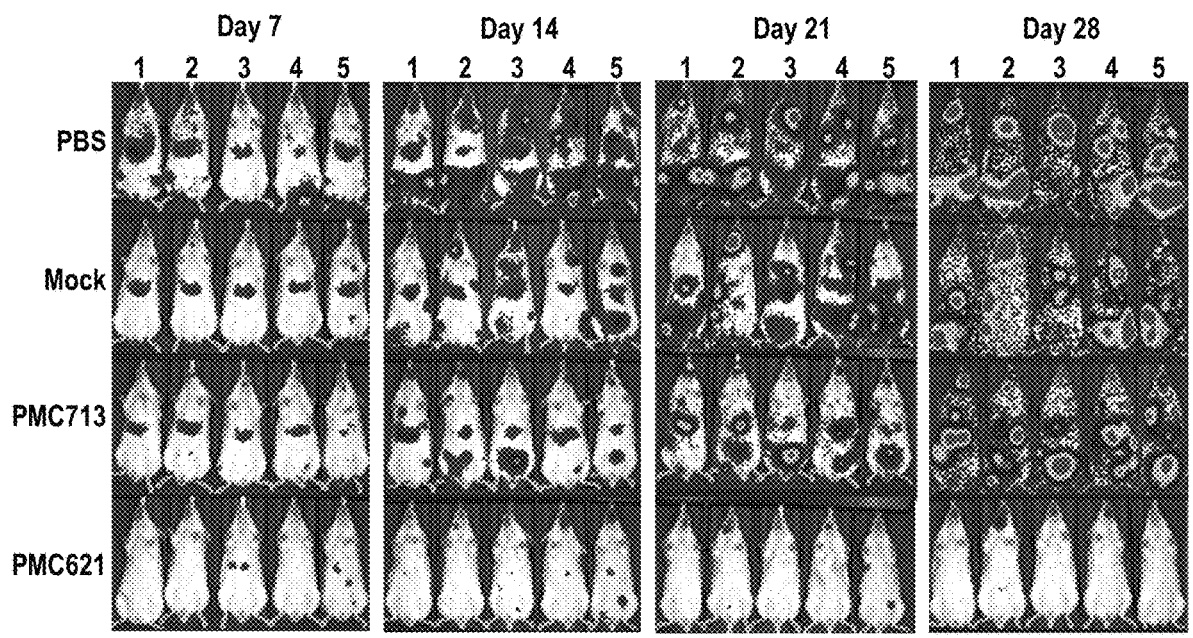
Figure 14B:
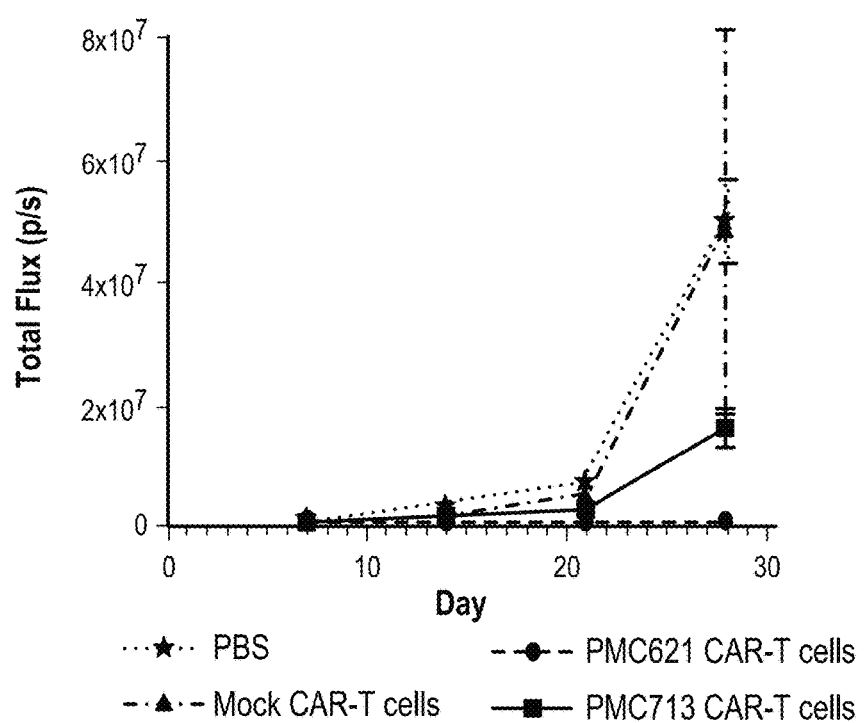

FIG. 14A shows the bioluminescent imaging of labeled RPMI8226 myeloma cells in mice. Mice were treated with PBS, mock CAR-T cells, PMC713 anti-CS1 CAR-T cells or PMC621 anti-CS1 CAR-T cells. FIG. 14B shows the quantitation of tumor burden in mice inoculated with RPMI8226 myeloma cells. p values=0.0063 for Mock vs PMC713 and <0.0001 for Mock vs PMC621 (both on day 28) by 2-way ANOVA with Tukey's post-hoc test.

DETAILED DESCRIPTION OF THE INVENTION

Definitions

As used herein, a "chimeric antigen receptor (CAR)" is a receptor protein that has been engineered to give T cells the new ability to target a specific protein. The receptor is chimeric because they combine both antigen-binding and T-cell activating functions into a single receptor. CAR is a fused protein comprising an extracellular domain capable of binding to an antigen, a transmembrane domain, and at least one intracellular domain. The "chimeric antigen receptor (CAR)" is sometimes called a "chimeric receptor", a "T-body", or a "chimeric immune receptor (CIR)." The "extracellular domain capable of binding to an antigen" means any oligopeptide or polypeptide that can bind to a certain antigen. The "intracellular domain" means any oligopeptide or polypeptide known to function as a domain that transmits a signal to cause activation or inhibition of a biological process in a cell.

As used herein, a "domain" means one region in a polypeptide which is folded into a particular structure independently of other regions.

As used herein, a "single chain variable fragment (scFv)" means a single chain polypeptide derived from an antibody which retains the ability to bind to an antigen. An example of the scFv includes an antibody polypeptide which is formed by a recombinant DNA technique and in which Fv regions of immunoglobulin heavy chain (H chain) and light chain (L chain) fragments are linked via a spacer sequence. Various methods for engineering an scFv are known to a person skilled in the art.

As used herein, a "tumor antigen" means a biological molecule having antigenicity, expression of which causes cancer.

The inventors have generated mouse anti-human monoclonal antibody specifically targeting human CS1. The present invention is directed to a monoclonal anti-human CS1 antibody comprising $V_H$ having the amino acid of SEQ ID NO: 3 and VL having the amino acid of SEQ ID NO: 7. In one embodiment, the monoclonal anti-human CS1 antibody is a single-chain variable fragment (scFv). ScFv can be VH-linker-VL or VL-linker-VH.

The present invention is also directed to a chimeric antigen receptor fusion protein comprising from N-terminus to C-terminus: (i) a single-chain variable fragment (scFv) against CS1, in which $V_H$ has the amino acid sequence of SEQ ID NO: 3, and $V_L$ has the amino acid of SEQ ID NO: 7, (ii) a transmembrane domain, (iii) at least one co-stimulatory domains, and (iv) an activating domain. The CAR is referred to as CS1-CAR or anti-CS1-CAR throughout the application.

The inventors have produced CS1-CAR-T cells to target cancer cells overexpressing CS1 tumor antigen. The CS1-CAR-T cells of the present invention have high cytotoxic activity against hematological cancer cells.

Figure 3:
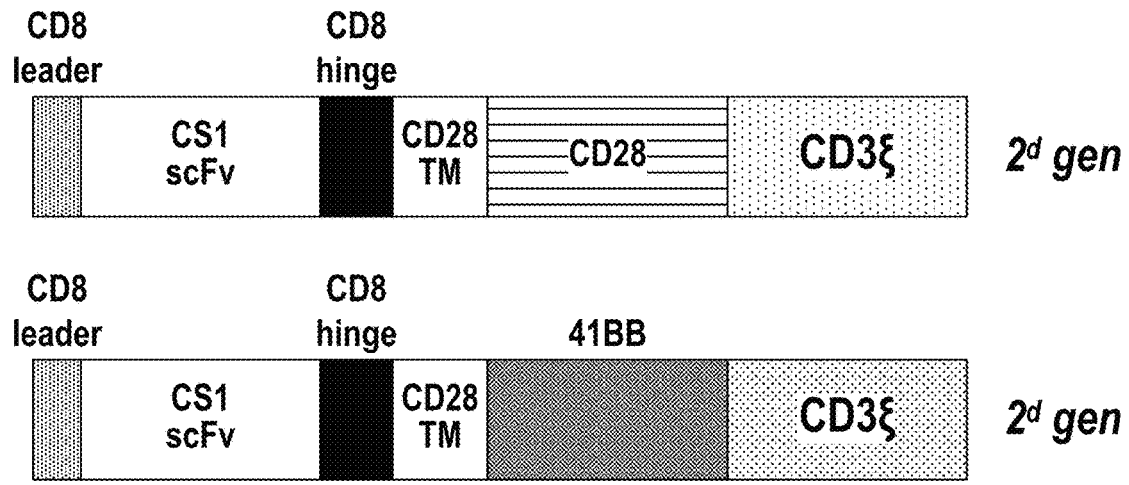
FIG. 3 shows the structure of CS1 CAR construct. The second-generation CAR was used with mouse CS1 ScFv and either CD28 or 4-1BB as co-stimulatory domains

In some embodiments, the CAR structures are shown in FIG. 3.

In one embodiment, the co-stimulatory domain is selected from the group consisting of CD28, 4-1BB, GITR, ICOS-1, CD27, OX-40 and DAP10. A preferred the co-stimulatory domain is CD28 or 4-1BB.

A preferred activating domain is CD3 zeta (CD3 Z or CD3ζ).

The transmembrane domain may be derived from a natural polypeptide, or may be artificially designed. The transmembrane domain derived from a natural polypeptide can be obtained from any membrane-binding or transmembrane protein. For example, a transmembrane domain of a T cell receptor α or β chain, a CD3 zeta chain, CD28, CD3ε, CD45, CD4, CD5, CD8, CD9, CD16, CD22, CD33, CD37, CD64, CD80, CD86, CD134, CD137, ICOS, CD154, or a GITR can be used. The artificially designed transmembrane domain is a polypeptide mainly comprising hydrophobic residues such as leucine and valine. It is preferable that a triplet of phenylalanine, tryptophan and valine is found at each end of the synthetic transmembrane domain. Optionally, a short oligopeptide linker or a polypeptide linker, for example, a linker having a length of 2 to 10 amino acids can be arranged between the transmembrane domain and the intracellular domain. In one embodiment, a linker sequence having a glycine-serine continuous sequence can be used.

The present invention provides a nucleic acid encoding the CS1-CAR. The nucleic acid encoding the CAR can be prepared from an amino acid sequence of the specified CAR by a conventional method. A base sequence encoding an amino acid sequence can be obtained from the aforementioned NCBI RefSeq IDs or accession numbers of GenBank for an amino acid sequence of each domain, and the nucleic acid of the present invention can be prepared using a standard molecular biological and/or chemical procedure. For example, based on the base sequence, a nucleic acid can be synthesized, and the nucleic acid of the present invention can be prepared by combining DNA fragments which are obtained from a cDNA library using a polymerase chain reaction (PCR).

A nucleic acid encoding the CAR of the present invention can be inserted into a vector, and the vector can be introduced into a cell. For example, a virus vector such as a retrovirus vector (including an oncoretrovirus vector, a lentivirus vector, and a pseudo type vector), an adenovirus vector, an adeno-associated virus (AAV) vector, a simian virus vector, a vaccinia virus vector or a sendai virus vector, an Epstein-Barr virus (EBV) vector, and a HSV vector can be used. A virus vector lacking the replicating ability so as not to self-replicate in an infected cell is preferably used.

For example, when a retrovirus vector is used, a suitable packaging cell based on a LTR sequence and a packaging signal sequence possessed by the vector can be selected for preparing a retrovirus particle using the packaging cell. Examples of the packaging cell include PG13 (ATCC CRL-10686), PA317 (ATCC CRL-9078), GP+E-86 and GP+en-vAm-12, and Psi-Crip. A retrovirus particle can also be prepared using a 293 cell or a 293T cell having high transfection efficiency. Many kinds of retrovirus vectors produced based on retroviruses and packaging cells that can be used for packaging of the retrovirus vectors are widely commercially available from many companies.

A CAR-T cell binds to a specific antigen via the CAR, thereby a signal is transmitted into the cell, and as a result, the cell is activated. The activation of the cell expressing the CAR is varied depending on the kind of a host cell and an intracellular domain of the CAR, and can be confirmed based on, for example, release of a cytokine, improvement of a cell proliferation rate, change in a cell surface molecule, or the like as an index. For example, release of a cytotoxic cytokine (IFN-gamma, a tumor necrosis factor, lymphotoxin, etc.) from the activated cell causes destruction of a target cell expressing an antigen. In addition, release of a cytokine or change in a cell surface molecule stimulates other immune cells, for example, a B cell, a dendritic cell, a NK cell, and a macrophage.

The cell expressing the CAR can be used as a therapeutic agent for a disease. The therapeutic agent comprises the cell expressing the CAR as an active ingredient, and it may further comprise a suitable excipient.

The inventors have generated CS1-CAR-T cells against hematological cancer cells overexpressing CS1 (e.g., multiple myeloma). The inventors have provided data demonstrating efficient expression of CS1 in hematological cancers (e.g., multiple myeloma). CS1-CAR-T cells express higher cytotoxic activity against CS1-positive cancer cells than non-transduced T cells or mock-CAR-T cells.

The advantage of the CS1 monoclonal antibody or CS1-ScFv of the present invention over other known CS1 antibodies is that the present antibody has high binding activity to multiple myeloma antigen, and it is highly specific against CS1-positive cancer cells of multiple myeloma. The CS1 monoclonal antibody or CS1-ScFv provides a wide range of antibody application for targeting hematological cancers. The CS1 antibody is highly potent as a therapeutic agent in many clinical applications.

The present monoclonal mouse anti-human CS1 antibody detects CS1 in CS1-positive cancer cells.

The present CS1 antibody can be used for immunotherapy applications: toxin/drug-conjugated antibody, monoclonal therapeutic antibody, humanization of CS1 antibody, CAR-T cell immunotherapy.

CS1-CAR-T cells using the present CS1 antibody can be effectively used to target CS1 antigen in CS1-positive cell lines (e.g., multiple myeloma).

CS1-CAR-T can be used in combination with different chemotherapies: checkpoint inhibitors, targeted therapies, small molecule inhibitors, and antibodies.

CS1 antibody can be modified by site-directed mutagenesis for affinity tuning; it can be used for humanization and for complete human antibody generation.

CS1-CAR-T cells can be used clinically against CS1-positive cells.

Modifications of co-stimulating domains (CD28, 4-1BB and others) can be used to increase the efficacy of CS1-CAR-T cells. Tag-conjugated CS1 scFv can be used for CAR generation.

Third generation CAR-T or other co-stimulating domains can be used with the present CS1-scFv to prepare CS1-CAR.

The present mouse CS1 antibody can be humanized for generation of CS1-CAR.

Combination of CS1 with other CAR targeting other tumor antigens or tumor microenvironment (VEGFR-1-3), PDL-1, CD80 or bi-scFv-CAR can be used to enhance activity of monotherapy CS1-CAR. Bi-specific antibodies with CS1 and CD3 or other antigens can be generated for therapy.

The present CS1-CAR can be used to generate other types of cells such as CS1-CAR-natural killer (NK) cells, CS1-CAR-macrophages, and other CS1-CAR hematopoietic cells, which can target CS1-positive cancers. The present invention provides T cells, or NK cells, macrophages, or other hematopoietic cells, modified to express the CS1-CAR.

The following examples further illustrate the present invention. These examples are intended merely to be illustrative of the present invention and are not to be construed as being limiting.

EXAMPLES

Example 1. Anti-CS1 Antibody: $V_H$ and $V_L$ and scFv Sequences

We generated mouse monoclonal anti-human CS1 antibody, clone 5G5A4 using hybridoma standard technology. We sequenced CS1 antibody. The structure of CS1 scFv is: VH-linker-VL. CS1 scFv was obtained by sequencing one of the hybridoma clones positive for CS1. The structure of CS1 scFv is: $V_H$-linker-$V_L$. Linker is G4Sx3.

The nucleotide sequence and the amino acid sequence of mouse CS1 $V_H$ are shown below.

```
                                            (SEQ ID NO: 2)
GAGGTGAAGCTGGTGGAGTCTGGGGGAGCCTTAGTGAAGCCTGGAGGGTCC

CTGAAACTCGCCTGTGCTGCCTCTGGATTCGCTTTCAGCAGCTATGACATG

TCTTGGGTTCGCCAGACTCCGGAGAAGAGGCTGGAGTGGGTCGCAACCATT

AGTAGTGGTGGTAGGAACACCTACTATCCAGACAGTGTGAGGGGCCGATTC

ACCATCTCCAGAGACAATGCCAGAAACACCCTGTATCTGCAAATGAGCAGT

CTGAGGTCTGAGGACACGGCCTTGTATTACTGTGCAACAAGAAATAGTAAC

TACGCCTTTGCTTATTGGGGCCAAGGGACTCTGGTCACTGTCTCTGCA (SEQ ID NO: 3)
EVKLVESGGALVKPGGSLKLACAASGFAFSSYDMSWVRQTPEKRLEWVATI

SSGGRNTYYPDSVRGRFTISRDNARNTLYLQMSSLRSEDTALYYCATRNSN

YAFAYWGQGTLVTVSA
```

The nucleotide sequence and the amino acid sequence of a linker are shown below.

```
                                            (SEQ ID NO: 4)
GGTGGCGGTGGTTCT GGTGGCGGTGGTTCT GGTGGCGGTGGTTCT (SEQ ID NO: 5)
GGGGSGGGGSGGGGS
```

The nucleotide sequence and the amino acid sequence of mouse CS1 V$_L$ are shown below.

(SEQ ID NO: 6)
GACATCAAGATGACCCAGTCTCCATCTTCCATGTATGCATCTCTAGGAGAG

AGAGTCACTATCACTTGCAAGGCAAGTCAGGACATTAATATCTATTTAAAC

TGGTTCCAGCAGAGACCAGGGAAATCTCCTAAGACCCTGATCTATCGTGCA

AACAGATTGGTTGACGGGGTCCCAGCAAGGTTCAGTGGCAGTGGATCTGGG

CAAGATTTTTCTCTCACCATCACCAGCCTGGAATATGAAGATATGGGAATT

TATTATTGTCTACAGTTTGATGAGTTTCCGCTCACGTTCGGTGCTGGGACC

AAGCTGGAGCTGAAACGG (SEQ ID NO: 7)
DIKMTQSPSSMYASLGERVTITCKASQDINIYLNWFQQRPGKSPKTLIYRA

NRLVDGVPARFSGSGSGQDFSLTITSLEYEDMGIYYCLQFDEFPLTFGAGT

KLELKR

The amino acid sequence of CS1 scFv (V$_H$-linker-V$_L$) is shown below. The bold highlights the amino acid sequence of V$_H$ (SEQ ID NO: 3); the underlined highlights the amino sequence of V$_L$ (SEQ ID NO: 7); in between (italicized) is the linker sequence (SEQ ID NO: 5).

(SEQ ID NO: 8)
EVKLVESGGALVKPGGSLKLACAASGFAFSSYDMSWVRQTPEKRLEWVATI

SSGGRNTYYPDSVRGRFTISRDNARNTLYLQMSSLRSEDTALYYCATRNSN

YAFAYWGQGTLVTVSA_GGGGSGGGGSGGGGS_DIKMTQSPSSMYASLGERVT

ITCKASQDINIYLNWFQQRPGKSPKTLIYRANRLVDGVPARFSGSGSGQDF

SLTITSLEYEDMGIYYCLQFDEFPLTFGAGTKLELKR

Example 2. CS1 Antibody Detected CS1 Proteins by FACS in Multiple Myeloma Cells and in Stable CHO-CS1 Cells The antibody CS1 detected extracellular CS1 protein by FACS staining in three different multiple myeloma cell lines (H929, MM1S, RPMI8226) but not in leukemia K562 cells.

We also detected CS1 in CHO-CS1 stably transformed cells. Both our CS1 antibody and positive control CS1 antibody from BioLegend, Inc. detected CS1 antigen.

Example 3. Expression of CS1 was Low in Normal Tissues

We performed immunohistochemistry staining at 1:1400 dilution of antibody with normal and neoplastic human tissues. A panel of normal and neoplastic human tissues was stained with the antibody, then counterstained with hematoxylin. Strong antibody staining was not detected in several normal tissues: cardiac muscle, cerebellum, brain, lung, pancreas, kidney, rectum, and thyroid; but was detected in tonsils. We also tested three cancer tissues, and the negative staining was detected in lung cancer, ovarian cancer, and colon cancer. Thus, this antibody (clone 5G584) has a good specificity and is suitable for CAR design.

Example 4. CS1-CAR Sequences

The scheme of CS1-CAR construct is shown in FIG. 3. Lentiviral vector with either EF1 promoter or MNDU3 promoter was used for cloning of all scFv CAR sequences.

The following nucleotide and amino sequences show CS1 ScFv-CD8 hinge-TM28-CD28/41-BB-CD3 zeta of the present invention. The structure includes human CD8 signaling peptide, mouse CS1 scFv (V$_H$-Linker-V$_L$), human CD8 hinge, human CD28 transmembrane, co-stimulating domain human CD28 or 41-BB, activation domain human CD3 zeta (FIG. 3).

A. CD28 as a Co-Stimulating Domain

The nucleic acid sequence and amino acid sequence of each segment of CD8 leader-CS1 scFv (V$_H$-Linker-V$_L$)-CD8 hinge-CD28 TM-CD28-CD3-zeta (CS1-CD28 CAR) are shown below.

<CD8 leader>
(SEQ ID NO: 9)
ATGGCCTTACCAGTGACCGCCTTGCTCCTGCCGCTGGCCTTGCTGCTCCACGCCGCC AGGCCGgctagc (SEQ ID NO: 10)
MALPVTALLLPLALLLHAARPAS <CS1 ScFv>(V$_H$-Linker-V$_L$)
See Example 1 for nucleic acid sequences and amino acid sequences.

<XhoI restriction site>
CTCGAG

<CD8 hinge>
(SEQ ID NO: 11)
AAGCCCACCACGACGCCAGCGCCGCGACCACCAACACCGGCGCCCACCATCGCGTC

GCAGCCCCTGTCCCTGCGCCCAGAGGCGAGCCGGCCAGCGGCGGGGGGCGCAGTGC

ACACGAGGGGGCTGGACTTCGCCAGTGATaagccc (SEQ ID NO: 12)
KPTTTPAPRPPTPAPTIASQPLSLRPEASRPAAGGAVHTRGLDFASDKP <CD28 TM>
(SEQ ID NO: 13)
TTTTGGGTGCTGGTGGTGGTTGGTGGAGTCCTGGCTTGCTATAGCTTGCTAGTAACA
GTGGCCTTTATTATTTTCTGGGTG (SEQ ID NO: 14)
F W V L V V V G G V L A C Y S L L V T V A F I I F W V <CD28/Co-stimulation domain>
(SEQ ID NO: 15)
AGGAGTAAGAGGAGCAGGCTCCTGCACAGTGACTACATGAACATGACTCCCCGCCG
CCCCGGGCCCACCCGCAAGCATTACCAGCCCTATGCCCCACCACGCGACTTCGCAGC
CTATCGCTCC (SEQ ID NO: 16)
R S K R S R L L H S D Y M N M T P R R P G P T R K H Y Q P Y A P P R D F A A Y R S <CD3 zeta>
(SEQ ID NO: 17)
AGAGTGAAGTTCAGCAGGAGCGCAGACGCCCCCGCGTACCAGCAGGGCCAGAACC
AGCTCTATAACGAGCTCAATCTAGGACGAAGAGAGGAGTACGATGTTTTGGACAAG
AGACGTGGCCGGGACCCTGAGATGGGGGGAAAGCCGAGAAGGAAGAACCCTCAGG
AAGGCCTGTACAATGAACTGCAGAAAGATAAGATGGCGGAGGCCTACAGTGAGATT
GGGATGAAAGGCGAGCGCCGGAGGGGCAAGGGGCACGATGGCCTTTACCAGGGTCT
CAGTACAGCCACCAAGGACACCTACGACGCCCTTCACATGCAGGCCCTGCCCCCTCG
CTAATAG (SEQ ID NO: 18)
RVKFSRSADAPAYQQGQNQLYNELNLGRREEYDVLDKRRGRDPEMGGKPRRKNPQEG
LYNELQKDKMAEAYSEIGMKGERRRGKGHDGLYQGLSTATKDTYDALHMQALPPR <EcoRI restriction site>
gaattc Full length of CS1-CAR nucleotide sequence (with CD 28 as co-stimulating domain) is shown below:

(SEQ ID NO: 19)
ATGGCCTTACCAGTGACCGCCTTGCTCCTGCCGCTGGCCTTGCTGCTCCAC
GCCGCCAGGCCGgctagcGAGGTGAAGCTGGTGGAGTCTGGGGGAGCCTTA
GTGAAGCCTGGAGGGTCCCTGAAACTCGCCTGTGCTGCCTCTGGATTCGCT
TTCAGCAGCTATGACATGTCTTGGGTTCGCCAGACTCCGGAGAAGAGGCTG
GAGTGGGTCGCAACCATTAGTAGTGGTGGTAGGAACACCTACTATCCAGAC
AGTGTGAGGGGCCGATTCACCATCTCCAGAGACAATGCCAGAAACACCCTG
TATCTGCAAATGAGCAGTCTGAGGTCTGAGGACACGGCCTTGTATTACTGT
GCAACAAGAAATAGTAACTACGCCTTTGCTTATTGGGGCCAAGGGACTCTG
GTCACTGTCTCTGCA *GGTGGCGGTGGTTCT GGTGGCGGTGGTTCT GGT*
*GGCGGTGGTTCT*GACATCAAGATGACCCAGTCTCCATCTTCCATGTATGCA
TCTCTAGGAGAGAGTCACTATCACTTGCAAGGCAAGTCAGGACATTAAT
ATCTATTTAAACTGGTTCCAGCAGAGACCAGGGAAATCTCCTAAGACCCTG
ATCTATCGTGCAAACAGATTGGTTGACGGGGTCCCAGCAAGGTTCAGTGGC AGTGGATCTGGGCAAGATTTTTCTCTCACCATCACCAGCCTGGAATATGAA
GATATGGGAATTTATTATTGTCTACAGTTTGATGAGTTTCCGCTCACGTTC
GGTGCTGGGACCAAGCTGGAGCTGAAACGGctcgagAAGCCCACCACGACG
CCAGCGCCGCGACCACCAACACCGGCGCCCACCATCGCGTCGCAGCCCCTG
TCCCTGCGCCCAGAGGCGAGCCGGCCAGCGGCGGGGGGCGCAGTGCACACG
AGGGGGCTGGACTTCGCCAGTGATaagcccttttgggtgctggtggtggtt
ggtggagtcctggcttgctatagcttgctagtaacagtggcctttattatt
ttctgggtgaggagtaagaggagcaggctcctgcacagtgactacatgaac
atgactccccgccgcccccgggcccacccgcaagcattaccagccctatgcc
ccaccacgcgacttcgcagcctatcgctccAGAGTGAAGTTCAGCAGGAGC
GCAGACGCCCCCGCGTACCAGCAGGGCCAGAACCAGCTCTATAACGAGCTC
AATCTAGGACGAAGAGAGGAGTACGATGTTTTGGACAAGAGACGTGGCCGG
GACCCTGAGATGGGGGGAAAGCCGCAGAAGGAAGAACCCTCAGGAAGGC
CTGTACAATGAACTGCAGAAAGATAAGATGGCGGAGGCCTACAGTGAGATT
GGGATGAAAGGCGAGCGCCGGAGGGGCAAGGGGCACGATGGCCTTTACCAG

GGTCTCAGTACAGCCACCAAGGACACCTACGACGCCCTTCACATGCAGGCC

CTGCCCCCTCGCTAA

The translated amino-acid sequence of CS1-CAR is shown below.

(SEQ ID NO: 20)
MALPVTALLLPLALLLHAARPASEVKLVESGGALVKPGGSLKLACAASGFA

FSSYDMSWVRQTPEKRLEWVATISSGGRNTYYPDSVRGRFTISRDNARNTL

YLQMSSLRSEDTALYYCATRNSNYAFAYWGQGTLVTVSAGGGGSGGGGSGG

GGSDIKMTQSPSSMYASLGERVTITCKASQDINIYLNWFQQRPGKSPKTLI

YRANRLVDGVPARFSGSGSGQDFSLTITSLEYEDMGIYYCLQFDEFPLTFG

AGTKLELKRLEKPTTTPAPRPPTPAPTIASQPLSLRPEASRPAAGGAVHTR

GLDFASDKPFWVLVVVGGVLACYSLLVTVAFIIFWVRSKRSRLLHSDYMNM

TPRRPGPTRKHYQPYAPPRDFAAYRSRVKFSRSADAPAYQQGQNQLYNELN

LGRREEYDVLDKRRGRDPEMGGKPQRRKNPQEGLYNELQKDKMAEAYSEIG

MKGERRRGKGHDGLYQGLSTATKDTYDALHMQALPPR

B. 41-BB as a Co-Stimulating Domain

We also generated CAR (PMC713) with 41BB domain instead of CD28 domain. The nucleotide sequence is below (41BB domain is in bold underlined):

(SEQ ID NO: 21)
ATGGCCTTACCAGTGACCGCCTTGCTCCTGCCGCTGGCCTTGCTGCTCCAC

GCCGCCAGGCCGgctagcGAGGTGAAGCTGGTGGAGTCTGGGGGAGCCTTA

GTGAAGCCTGGAGGGTCCCTGAAACTCGCCTGTGCTGCCTCTGGATTCGCT

TTCAGCAGCTATGACATGTCTTGGGTTCGCCAGACTCCGGAGAAGAGGCTG

GAGTGGGTCGCAACCATTAGTAGTGGTGGTAGGAACACCTACTATCCAGAC

AGTGTGAGGGGCCGATTCACCATCTCCAGAGACAATGCCAGAAACACCCTG

TATCTGCAAATGAGCAGTCTGAGGTCTGAGGACACGGCCTTGTATTACTGT

GCAACAAGAAATAGTAACTACGCCTTTGCTTATTGGGGCCAAGGGACTCT

GGTCACTGTCTCTGCA*GGTGGCGGTGGTTCTGGTGGCGGTGGTTCT*

*GGTGGCGGTGGTTCT*GACATCAAGATGACCCAGTCTCCATCTTCCATGT

ATGCATCTCTAGGAGAGAGTCACTATCACTTGCAAGGCAAGTCAGGACA

TTAATATCTATTTAAACTGGTTCCAGCAGAGACCAGGGAAATCTCCTAAGA

CCCTGATCTATCGTGCAAACAGATTGGTTGACGGGGTCCCAGCAAGGTTCA

GTGGCAGTGGATCTGGGCAAGATTTTTCTCTCACCATCACCAGCCTGGAAT

ATGAAGATATGGGAATTTATTATTGTCTACAGTTTGATGAGTTTCCGCTCA

CGTTCGGTGCTGGGACCAAGCTGGAGCTGAAACGGctcgagAAGCCCACCA

CGACGCCAGCGCCGCGACCACCAACACCGGCGCCCACCATCGCGTCGCAGC

CCCTGTCCCTGCGCCCAGAGGCGAGCCGGCCAGCGGCGGGGGGCGCAGTGC

ACACGAGGGGGCTGGACTTCGCCAGTGATaagcccttttgggtgctggtgg tggttggtggagtcctggcttgctatagcttgctagtaacagtggccttta ttattttctgggtg<u>AAACGGGGCAGAAAGAAACTCCTGTATATATTCAAAC</u>

<u>AACCATTTATGAGACCAGTACAAACTACTCAAGAGGAAGATGGCTGTAGCT</u>

<u>GCCGATTTCCAGAAGAAGAAGAAGGAGGATGTGAACTG</u>AGAGTGAAGTTCA

GCAGGAGCGCAGACGCCCCCGCGTACCAGCAGGGCCAGAACCAGCTCTATA

ACGAGCTCAATCTAGGACGAAGAGAGGAGTACGATGTTTTGGACAAGAGAC

GTGGCCGGGACCCTGAGATGGGGGGAAAGCCGCAGAGAAGGAAGAACCCTC

AGGAAGGCCTGTACAATGAACTGCAGAAAGATAAGATGGCGGAGGCCTACA

GTGAGATTGGGATGAAAGGCGAGCGCCGGAGGGGCAAGGGGCACGATGGCC

TTTACCAGGGTCTCAGTACAGCCACCAAGGACACCTACGACGCCCTTCACA

TGCAGGCCCTGCCCCCTCGCTAA

Amino-Acid Sequence of CS1-41BB-CD3 CAR: (41BB Underlined, Bold)

(SEQ ID NO: 22)
MALPVTALLLPLALLLHAARPASEVKLVESGGALVKPGGSLKLACAASGFA

FSSYDMSWVRQTPEKRLEWVATISSGGRNTYYPDSVRGRFTISRDNARNTL

YLQMSSLRSEDTALYYCATRNSNYAFAYWGQGTLVTVSAGGGGSGGGGSGG

GGSDIKMTQSPSSMYASLGERVTITCKASQDINIYLNWFQQRPGKSPKTLI

YRANRLVDGVPARFSGSGSGQDFSLTITSLEYEDMGIYYCLQFDEFPLTFG

AGTKLELKRLEKPTTTPAPRPPTPAPTIASQPLSLRPEASRPAAGGAVHTR

GLDFASDKPFWVLVVVGGVLACYSLLVTVAFIIFWVKRGRKKLLYIFKQPF

MRPVQTTQEEDGCSCRFPEEEEGGCELRVKFSRSADAPAYQQGQNQLYNEL

NLGRREEYDVLDKRRGRDPEMGGKPQRRKNPQEGLYNELQKDKMAEAYSEI

GMKGERRRGKGHDGLYQGLSTATKDTYDALHMQALPPR

Nucleotide Sequence of 4-1BB Domain:

(SEQ ID NO: 23)
AAACGGGGCAGAAAGAAACTCCTGTATATATTCAAACAACCATTTATGAGA

CCAGTACAAACTACTCAAGAGGAAGATGGCTGTAGCTGCCGATTTCCAGAA

GAAGAAGAAGGAGGATGTGAACTG

Amino Acid Sequence of 4-1BB Domain:

(SEQ ID NO: 24)
KRGRKKLLYIFKQPFMRPVQTTQEEDGCSCRFPEEEEGGCEL

Example 5. CAR Lentivirus Production

The inventors generated CS1 CAR constructs inside lentiviral vector cloned into lentiviral vector. CS1-28-CD3 lentiviral CAR construct containing the CS1 ScFv-CD28-CD3zeta insert under EF1 (PMC273) or MNDU3 promoter (PMC621)—or same CAR under MNDU3 promoter with 41BB domain instead of CD28 domain (PMC713).

The lentiviruses were generated in 293 T cells and titer was established by RT-PCR or by functional FACS with 293 cells as described [5]. Then equal dose of lentiviruses was used for transduction of T cells.

Example 6. Peripheral Blood Mononuclear Cell (PBMC) Isolation from Whole Blood

Whole blood (Stanford Hospital Blood Center, Stanford, CA) was collected from individual or mixed donors (depending on the amount of blood required) in 10 mL Heparin VACUTAINERS® (device for collecting blood specimen, Becton Dickinson). Approximately 10 ml of whole anticoagulated blood was mixed with sterile phosphate buffered saline (PBS) buffer for a total volume of 20 ml in a 50 ml conical centrifuge tube (PBS, pH 7.4, is without Ca+2/Mg+ 2). The layer of cells containing peripheral blood mononuclear cells (PBMC), seen at the diluted plasma/FICOLL® (copolymers of sucrose and epichlorohydrin) interface was removed very carefully, avoiding any FICOLL®, washed twice with PBS, and centrifuged at 200×g for 10 min at room temperature. Cells were counted with a hemocytomter. The PBMC were washed once with CAR-T media (AIM V-ALBUMAX® (BSA) (Life Technologies), with 5% AB serum and 1.25 ug/mL amphotericin B (Gemini Bioproducts, Woodland, CA), 100 U/mL penicillin, and 100 ug/mL streptomycin) and were either used for experiments or were frozen at −80° C. for next experiment.

Example 7. T-Cell Activation from PBMC

Freshly isolated PBMC were washed with 1×PBS (pH7.4, no Ca2+/Mg2+) and washed once in CAR-T media (AIM V-ALBUMAX® (BSA) (Life Technologies), with 5% AB serum and 1.25 μg/mL amphotericin B (Gemini Bioproducts, Woodland, CA), 100 U/mL penicillin, and 100 μg/mL streptomycin), in the absence of human interleukin-2 (huIL-2) (Invitrogen), at a concentration of 5×105 cells/mL. The cells were resuspended to a final concentration of 5×105 cells/mL in CAR-T medium with 300U/mL huIL2. The PBMC was activated with CD3-CD28 beads with 1:1 bead-to-cell ratio. Desired number of aliquots were dispensed to single wells of a culture plate, and then incubated at 37° C. in the presence of CO2 for 24 hours before viral transduction.

Example 8. T-Cell Transduction and Expansion

Following activation of PBMC, the cells were incubated for 24 hr at 37° C., 5% CO2. To each well of 1×106 cells, 5×106 lentivirus, and 2 μL/mL of media of TRANSPLUS™ (Alstem, Richmond, CA) (a final dilution of 1:500) were added. Cells were incubated for an additional 24 hours before repeating addition of virus. Cells were then grown in the continued presence of 300 U/Ml of IL-2 Fresh medium with IL-2 for a period of 12-14 days (total incubation time was dependent on the final umber of CAR-T cells required). Cells concentrations were analyzed every 2-3 days, with media being added at that time to dilute the cell suspension to 1×106 cells/mL.

Example 9. FACS for Detection of CAR-Positive Cells

Cells were washed and suspended in FACS buffer (phosphate-buffered saline (PBS) plus 0.1% sodium azide and 0.4% BSA). Cells were divided them 1×10⁶ aliquots.
Fc receptors were blocked with normal goat IgG (Life Technologies) in ice for 10 min.
Biotin-labeled polyclonal goat anti-mouse-F(ab)₂ antibodies (Life Technologies) were used to detect CS1 ScFv; biotin-labeled normal polyclonal goat IgG antibodies (Life Technologies) were used as an isotype control. (1:200 dilution, reaction volume of 100 μl). Cells were incubated at 4° C. for 25 minutes and washed once with FACS buffer.
Cells were suspended in FACS buffer and blocked with normal mouse IgG (Invitrogen) by adding 100 μl 1:1000 diluted normal mouse IgG to each tube. Cells were incubated in ice for 10 min and washed with FACS buffer and re-suspended in 100 μl FACs buffer. The cells were then stained with phycoerythrin (PE)-labeled streptavidin (BD Pharmingen, San Diego, CA) and allophycocyanin (APC)-labeled CD3 (eBiocience, San Diego, CA).

Example 10. Cytotoxicity Assay

The Real-time Cytotoxicity Assay (RTCA) was performed using ACEA machine according to manufacturer's protocol as described [5].

Example 11. CS1-CD28-CD3 CAR-T Cells Expressed CS1 ScFv

Figure 4:
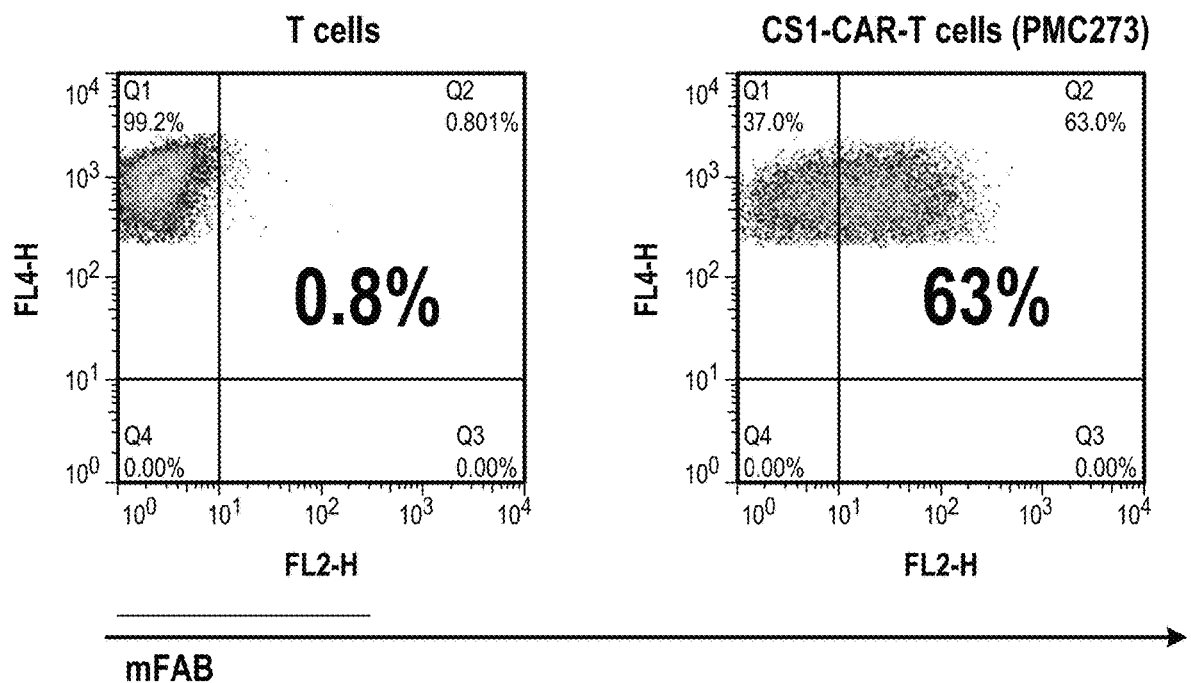
FIG. 4 shows the detection of CAR-positive T cells by FACS with mouse anti-FAB antibody.

The CS1 scFv sequence was inserted with CD28 costimulatory and CD3 zeta activation domains inside CAR (PMC273), and CAR lentiviruses were transduced into T cells. The CS1-CAR cells were effectively expanded in vitro. Mock control with scFv from intracellular protein were generated and used as a negative control in cytotoxicity and cytokine assay. FIG. 4 shows that 63% of CS1-CAR cells were detected by FACS with a mouse FAB antibody, whereas only 0.8% of control T cells were positively detected.

Example 12. CS1-CAR-T Cells Killed CHO-CS1 Cells

Figure 5A:
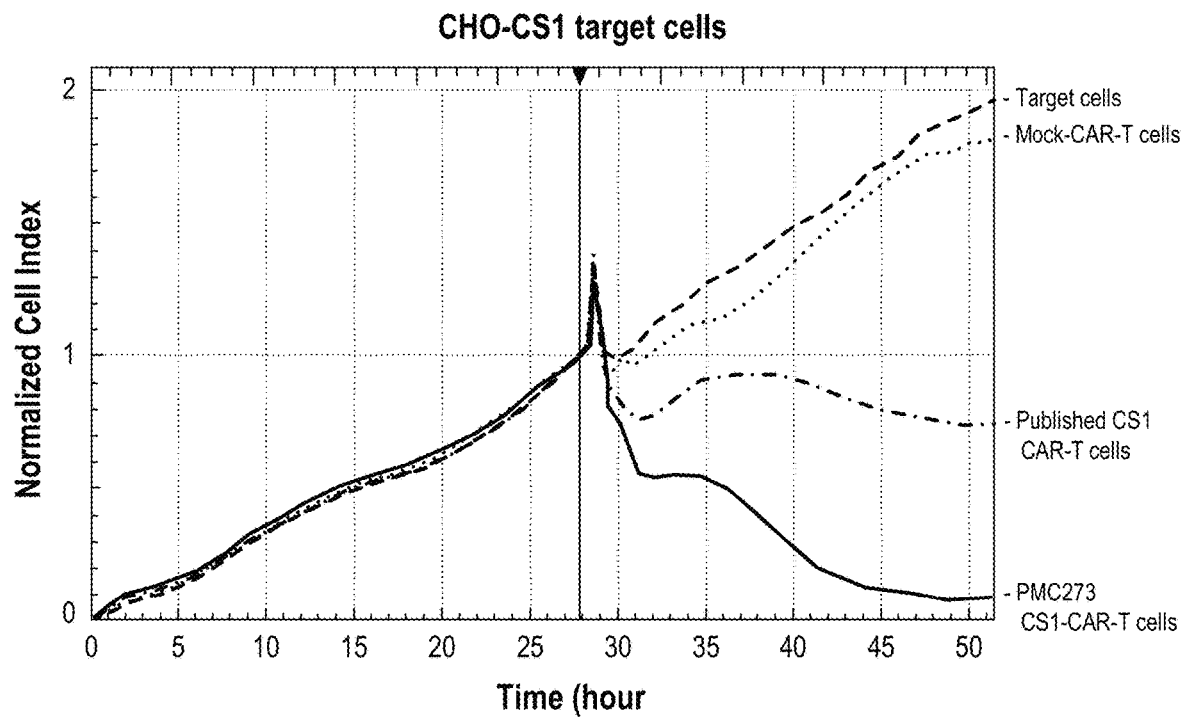
FIG. 5A shows that CS1-CAR-T cells killed CHO-CS1 cells.
Figure 5B:
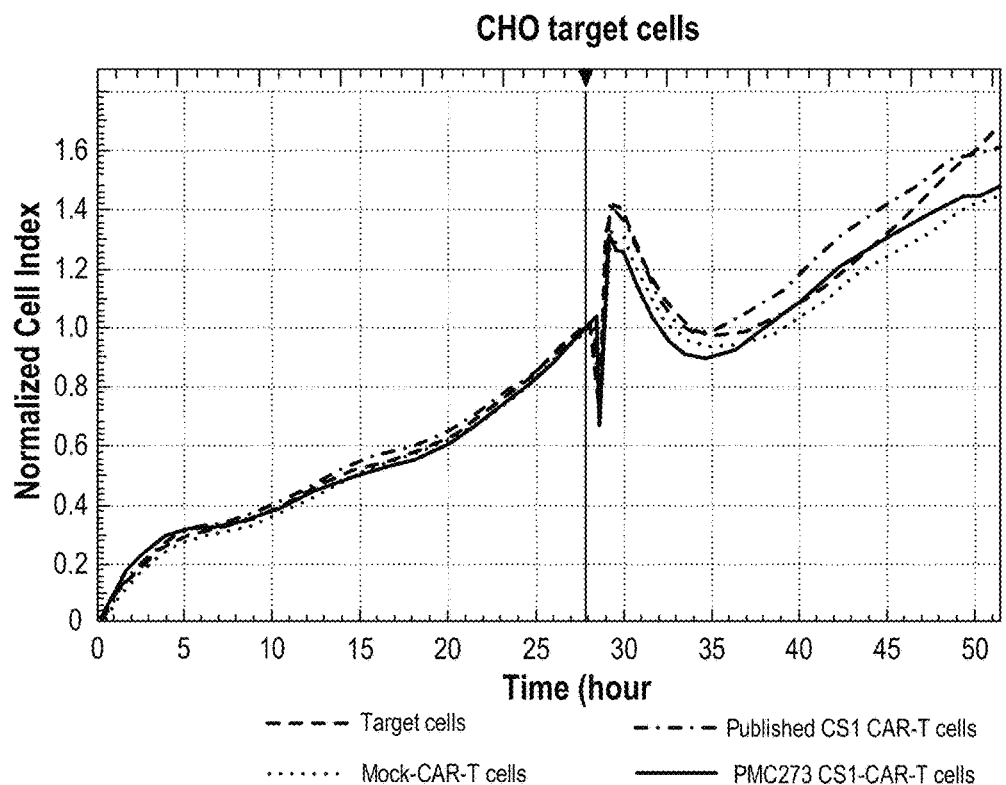
FIG. 5B shows that CS1-CAR-T cells did not kill negative control.CHO cells.

CS1-CAR-T cells were co-incubated with CHO-CS1 stable cell lines and CHO cells (CS1-negative) and the RTCA was performed using impedance-based XCELLIGENCE® (real-time cell analyzers) system. CS1-CAR-T cells of the present invention (Promab CS1-CAR-T cells) killed CHO-CS1 cells better than another known CS1 antibody-CAR-T cells (FIG. 5A). CS1-CAR-T cells did not kill CHO (FIG. 5B).

Figure 6:
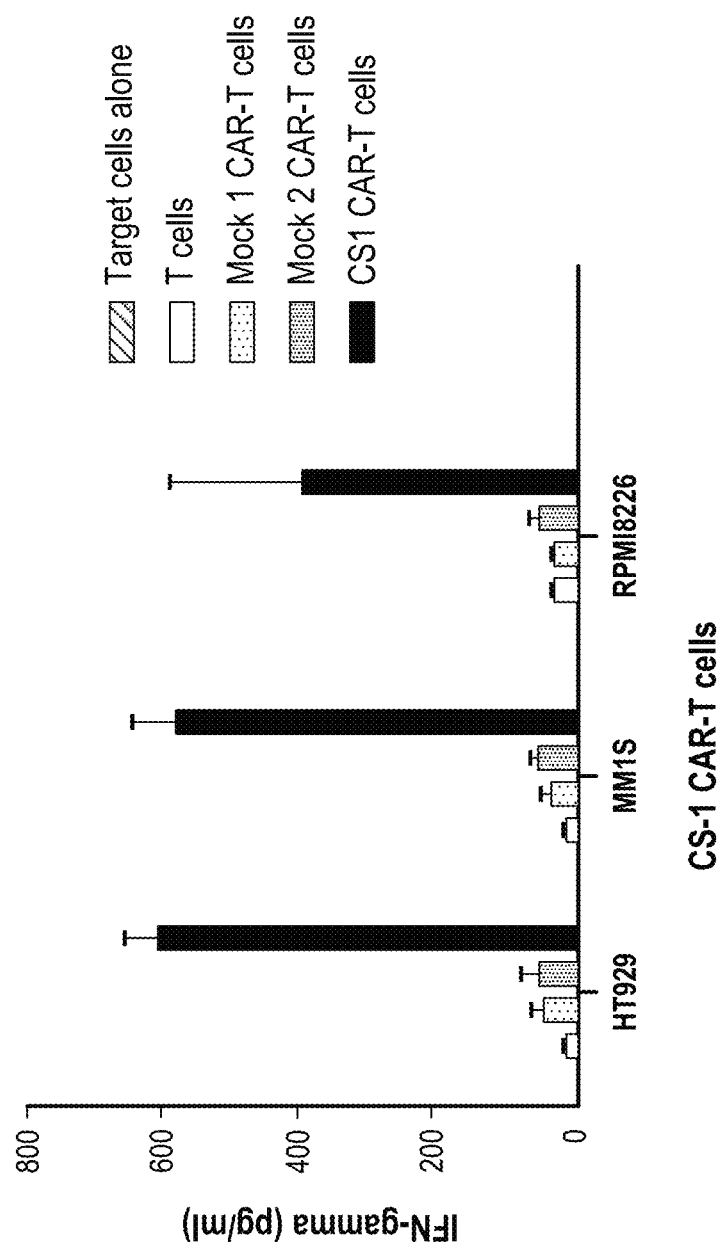
FIG. 6 shows the IFN-γ secretion by CS1-CAR-T cells in RPMI8226, H929 and MM1S multiple myeloma cells. Different Mock-CAR-T cells were used as negative control cells. * p<0.05 CAR-T cells versus Mock CAR-T cells, Student's t-test.
Figure 7:
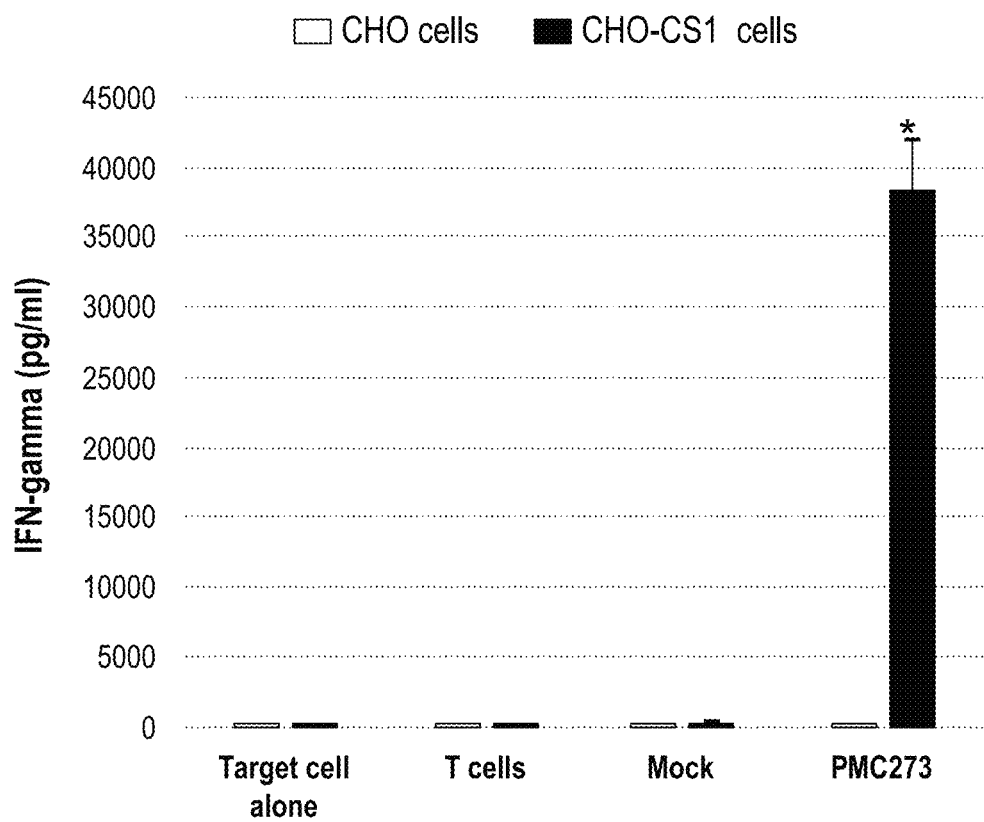
FIG. 7 shows that CS1-CAR-T cells secreted high level of IFN-gamma against CHO-CS1 cells but not against CHO cells.

Example 13. CS1-CD28-CD3 CAR-T Cells Secreted High Level of IFN-Gamma Against CS1-Positive Multiple Myeloma Cancer Cells We collected supernatant of CS1-CD28-CD3-CAR-T incubated with multiple myeloma cancer cells and performed ELISA with kit from Fisher according to manufacturer's protocol. The CS1-CAR-T secreted significantly higher level of IFN-gamma against CS1-positive cancer cells than the negative controls of Mock 1, Mock 2-CAR-T cells (FIG. 6). These data show that CS1-CD28-CD3 CAR-T cell secreted IFN-gamma against multiple myeloma.
FIG. 7 shows that high level of IFN-gamma was detected after incubation of CS1-CAR-T cells with CHO-CS1 cells but not with CHO cells. This shows high specificity of CS1-CAR-T cells.

Figure 8A:
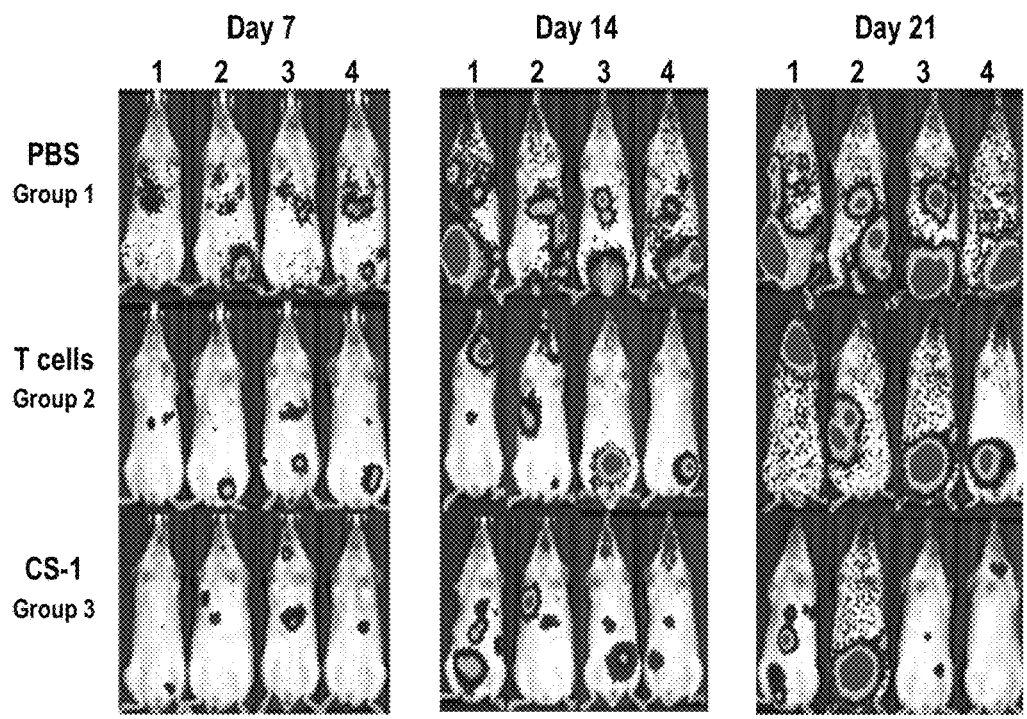
FIG. 8A shows the images of RPMI8226 xenografts in NSG mice after treatment with CS1-CAR-T cells, PBS, and T cells. Mice showed decreased signals after treating with CS1-28-CD3 CAR-T cells (top panel).

Example 14. CS1-28-CD3-CAR-T Cells Significantly Decreased RPMI8226 Multiple Myeloma Tumor Growth In Vivo We used NSG mice and injected RPMI8226-luciferase positive cells intravenously into mice. Next day we performed intravenous injections of CS1-CD28-CD3-CAR-T cells in NSG mice. The bioluminescence signal was significantly decreased by CS1-CAR-T cells (FIG. 8A), which demonstrates that CS1-CAR-T cells significantly decreased RPMI8226 multiple myeloma tumor growth.

Figure 8B:
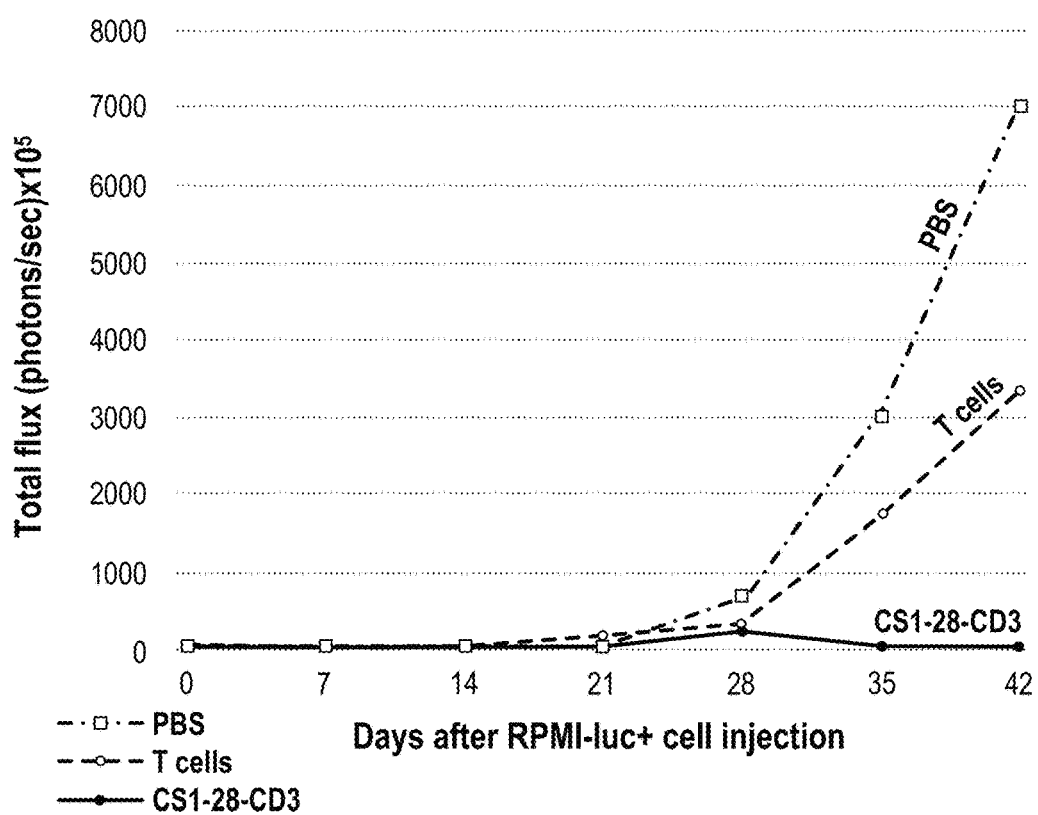
FIG. 8B shows that total flux (photons/sec) vs. days after the injection of RPMI8226 cells into NSG mice. Total flux was decreased after treatment with CS1-28-CD3 CAR-T cells.

FIG. 8B shows total flux (photons/sec) vs. days after RPMI8226 cells injection into NSG mice. FIG. 8B shows that CS1-CAR-T cells also prolonged survival of mice.

Example 15. CS1-CD28-CD3 CAR Under MNDU3 Promoter had Higher Expression of CAR-Positive Cells We also generated PMC621 with same CAR as PMC273 except with MNDU3 promoter rather than Ef1 promoter to drive expression of CAR. We used cells from three different donor (Donor 000, Donor 178, and Donon202) to prepare CAR-T cells.

On day 10 of T/CAR-T cell expansion, the T cells were analyzed by flow cytometry for CAR expression using a biotinylated goat polyclonal antibody specific for the Fab'2 fragment of mouse IgG which is present in the CS1-CAR. Stained cells were detected with fluorochrome-conjugated streptavidin. Over 95% of the cells in each CAR-T culture were stained, indicating that the vast majority of the cells in the cultures were CAR-T cells. Staining of the control cultures was under 1%.

Figure 9:
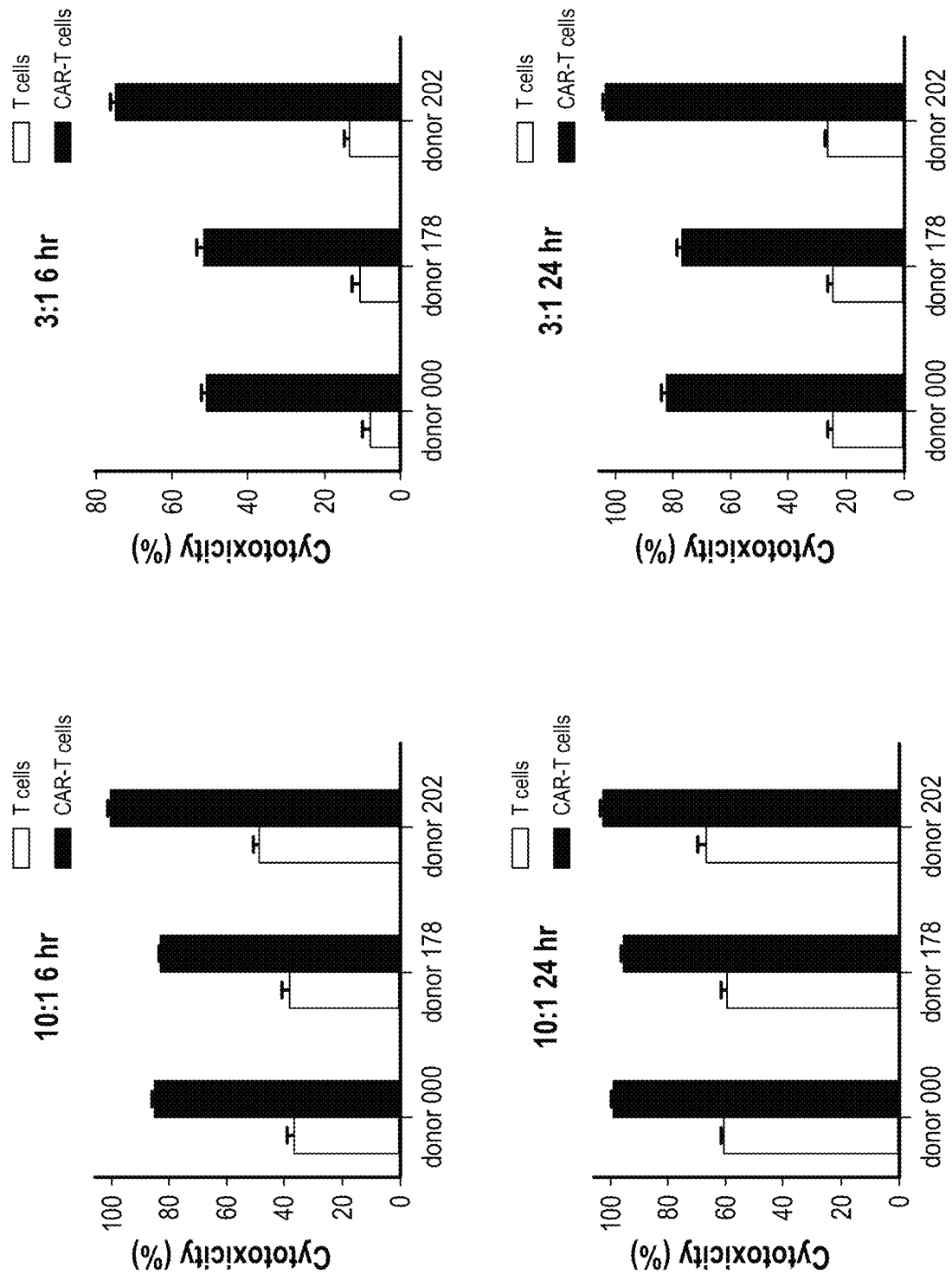
FIG. 9 shows the quantitation of the cytotoxicity assay with CS1-CAR-T cells and Hela-CS1 target cells. Cytotoxicity was calculated as $(X-Y)*100/X$, where X is the average impedance of the HeLa-CS1 monolayer in the absence of effector cells (HeLa-CS1 alone) and Y is the average impedance of the HeLa-CS1 monolayer in the presence of effector cells (3 replicates). For each T cell donor (000, 178, and 202), at each time-point and at each E:T ratio, the p values for CAR-T cells vs T cells are <0.0001 by 2-way ANOVA with Sidak's post-hoc test.
Figure 10:
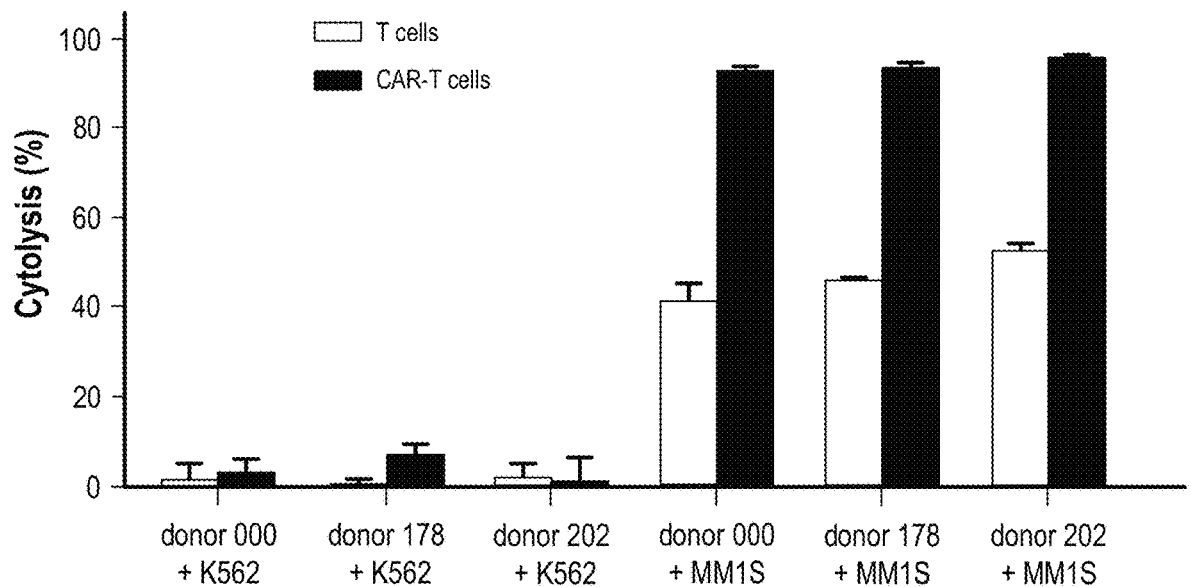
FIG. 10 shows the cytotoxic activity of anti-CS1 CAR-T cells against myeloma cells. Anti-CS1 CAR-T cells or control T cells were cultured with $CS1^+$ MM1S multiple myeloma cells or $CS1^-$ K562 control cells, and the mixtures were analyzed by flow cytometry with 7-AAD and a CD3 antibody. The average cytolysis of 2 replicates is shown. For all 3 donors cultured with MM1S cells, the p values for CAR-T cells vs T cells are <0.0001 (2-way ANOVA with Sidak's post-hoc test).

High killing activity of CAR-T cells from the 3 donors was observed in Hela-CS1 (FIG. 9) and multiple myeloma cells (MM1S) but not in leukemia K562 cells (FIG. 10).

Figure 11:
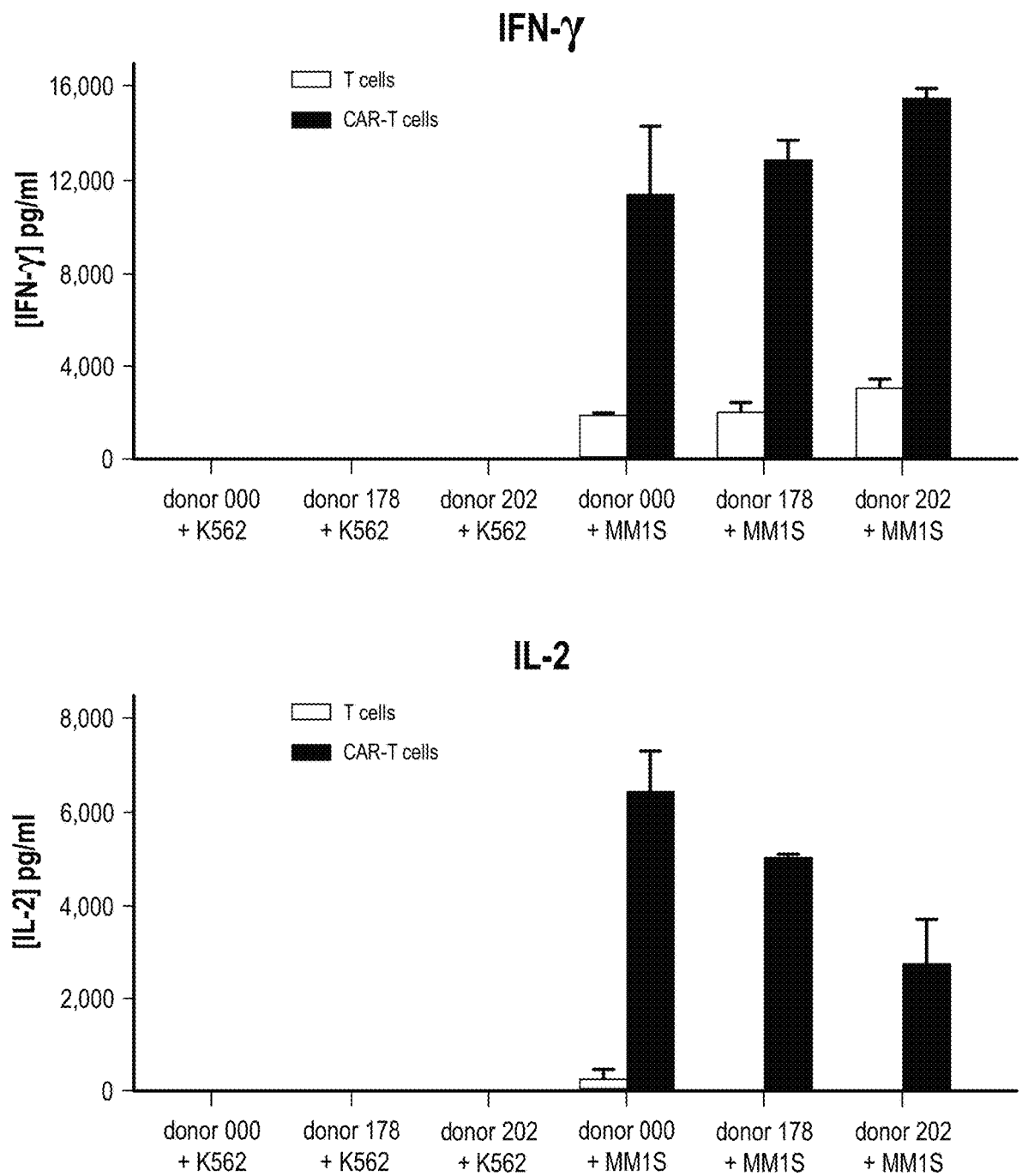
FIG. 11 shows the cytokine production by CS1-CAR-Tcells in response to myeloma cells. Medium was collected from the cultures, centrifuged to remove cells and analyzed by ELISA for the levels of IFN-γ, IL-2 and IL-6. The average of 2 replicates is shown. IL-6 was not detected. For all 3 donors cultured with MM1S cells, the p values for CAR-T cells vs T cells are <0.0001 for both IFN-γ and IL-2 (2-way ANOVA with Sidak's post-hoc test).

High secretion of IFN-γ and IL-2 cytokines was observed in Hela-CS1 cells (not shown) and multiple myeloma (FIG. 11).

Example 16. CS1-41BB-CD3 CAR-T Cells had High In Vitro and In Vivo Activity Against CS1-Positive Cells PMC713 CAR-T cells. We substituted the CD28 costimulatory domain of PMC621 with the 4-1BB costimulatory domain to improve CAR-T cell persistence in vivo. The new vector, PMC713, was used to produce virus and that virus was used in the manufacture of CAR-T cells in the 1-liter G-Rex container as described above. The cells expanded from 15 million on day 0 to 1.22 billion on day 10, an 80-fold increase. The cells were characterized on day 10 by flow cytometry with antibodies against mouse Fab'2. Almost all of the cells were CAR-T cells (not shown).

Figure 12:
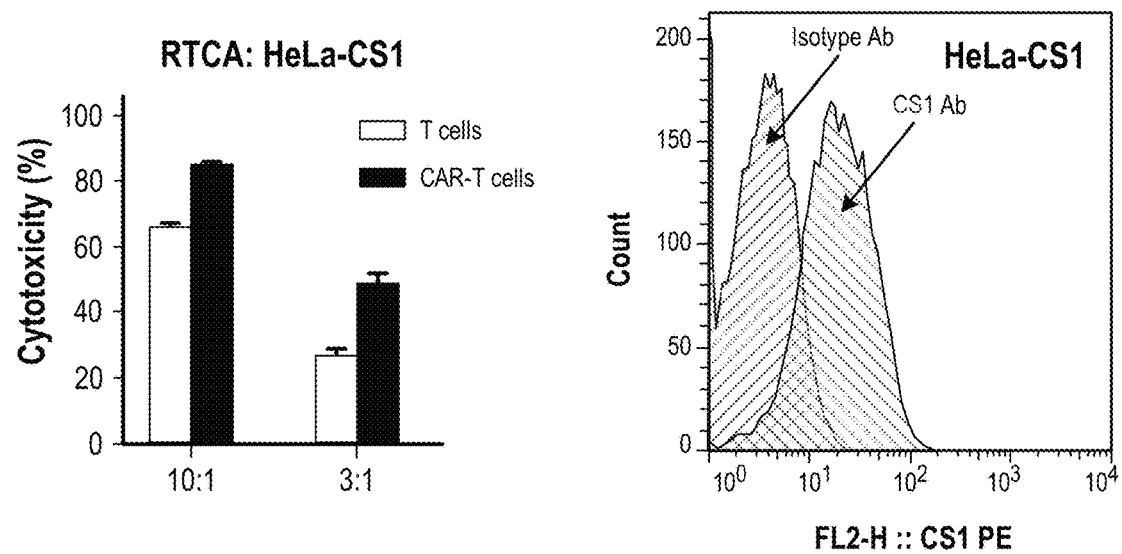
FIG. 12 shows the quantitation of the cytotoxicity assay and expression of CS1 on the target cells. Cytotoxicity was calculated as $(X-Y)*100/X$, where X is the average impedance of the HeLa-CS1 monolayer in the absence of effector cells (HeLa-CS1 alone) and Y is the average impedance of the HeLa-CS1 monolayer in the presence of effector cells (3 replicates). The p value for CAR-T cells vs T cells is 0.0001 at the 10:1 ratio and <0.0001 at the 3:1 ratio (2-way ANOVA with Sidak's post-hoc test). HeLa-CS1 target cells were stained with a mouse monoclonal antibody against CS1 or an isotype control antibody, followed by a PE-conjugated anti-mouse IgG secondary antibody.

The CS1-41BB-CD3-CAR-T cells had high cytotoxic activity against Hela-CS1 cells (FIG. 12). The CS1-41BB-CD3 CR-T secreted high level of IFN-γ and IL-6 cytokines in Hela-CS1 cells (FIG. 13A) and multiple myeloma cells (MM1S) but not in leukemia K562 cells (FIG. 13B).

Example 17. CS1-28-CD3 (PMC621)-CAR-T and CS1-41BB-CD3 (PMC713) Inhibited Multiple Myeloma Tumor Growth In Vivo PMC621 CAR-T cells and PMC713 CAR-T cells were used to test in vivo efficacy of CAR-T cells using NSG-RPMI8226 xenograft mouse model. Both PMC621 and PMC713 used the MNDU3 promoter to drive CAR expression; PMC621 contains the CD28 costimulatory domain, whereas PMC713 contains the 4-1BB costimulatory domain. In addition, the control cells were transduced with a TF tagged mock CAR lacking an scFv, and 99% of the cells were CAR+. Ninety percent of the PMC621 cells were CAR-T cells and 40% of the PMC713 cells were CAR-T cells, determined by flow cytometry. Both PMC621 and PMC713 significantly inhibited growth of RPMI8226 myeloma cells (FIGS. 14A and 14B). PMC621 completely blocked tumor growth in vivo.

REFERENCES

[1] S. A. Grupp, M. Kalos, D. Barrett, R. Aplenc, D. L. Porter, S. R. Rheingold, D. T. Teachey, A. Chew, B. Hauck, J. F. Wright, M. C. Milone, B. L. Levine, and C. H. June, Chimeric antigen receptor-modified T cells for acute lymphoid leukemia. N Engl J Med 368 (2013) 1509-18.

[2] M. V. Maus, A. R. Haas, G. L. Beatty, S. M. Albelda, B. L. Levine, X. Liu, Y. Zhao, M. Kalos, and C. H. June, T cells expressing chimeric antigen receptors can cause anaphylaxis in humans. Cancer Immunol Res 1 (2013) 26-31.

[3] M. V. Maus, S. A. Grupp, D. L. Porter, and C. H. June, Antibody-modified T cells: CARs take the front seat for hematologic malignancies. Blood 123 (2014) 2625-35.

[4] V. Golubovskaya, and L. Wu, Different Subsets of T Cells, Memory, Effector Functions, and CAR-T Immunotherapy. Cancers (Basel) 8 (2016).

[5] R. Berahovich, H. Zhou, S. Xu, Y. Wei, J. Guan, J. Guan, H. Harto, S. Fu, K. Yang, S. Zhu, L. Li, L. Wu, and V. Golubovskaya, CAR-T Cells Based on Novel BCMA Monoclonal Antibody Block Multiple Myeloma Cell Growth. Cancers (Basel) 10 (2018).

What is claimed is:

1. A monoclonal anti-human CS1 antibody comprising a heavy chain variable domain (VH) having the amino acid sequence of SEQ ID NO: 3 and a light chain variable domain (VL) having the amino acid sequence of SEQ ID NO: 7.

2. A single-chain variable fragment (scFv) comprising a VH having the amino acid sequence of SEQ ID NO: 3 and a VL having the amino acid sequence of SEQ ID NO: 7.

3. The scFv of claim 2, further comprising a linker in between the VH and the VL.

4. The scFv of claim 3, which has the amino acid sequence of SEQ ID NO: 8.

5. A chimeric antigen receptor (CAR) comprising from N-terminus to C-terminus:
   (i) the scFv of claim 2,
   (ii) a transmembrane domain,
   (iii) at least one co-stimulatory domain, and
   (iv) an activating domain.

6. The CAR of claim 5, wherein the scFv has the amino acid sequence of SEQ ID NO: 8.

7. The CAR according to claim 5, wherein the co-stimulatory domain is a CD28 or a 4-1BB co-stimulatory domain.

8. The CAR according to claim 5, wherein the activating domain is a CD3 zeta activating domain.

9. The CAR of claim 5, which has the amino acid sequence of SEQ ID NO: 20.

10. The CAR of claim 5, which has the amino acid sequence of SEQ ID NO: 22.

11. A nucleic acid encoding the CAR of claim 5.

12. A T cell or natural killer cell modified to express the CAR of claim 5.

* * * * *

SEQUENCE LISTING

```
<160> NUMBER OF SEQ ID NOS: 24

<210> SEQ ID NO 1
<211> LENGTH: 335
<212> TYPE: PRT
<213> ORGANISM: Homo sapiens

<400> SEQUENCE: 1

Met Ala Gly Ser Pro Thr Cys Leu Thr Leu Ile Tyr Ile Leu Trp Gln
1               5                   10                  15

Leu Thr Gly Ser Ala Ala Ser Gly Pro Val Lys Glu Leu Val Gly Ser
            20                  25                  30

Val Gly Gly Ala Val Thr Phe Pro Leu Lys Ser Lys Val Lys Gln Val
        35                  40                  45

Asp Ser Ile Val Trp Thr Phe Asn Thr Thr Pro Leu Val Thr Ile Gln
    50                  55                  60
```

Pro Glu Gly Gly Thr Ile Ile Val Thr Gln Asn Arg Asn Arg Glu Arg
65                  70                  75                  80

Val Asp Phe Pro Asp Gly Gly Tyr Ser Leu Lys Leu Ser Lys Leu Lys
            85                  90                  95

Lys Asn Asp Ser Gly Ile Tyr Tyr Val Gly Ile Tyr Ser Ser Ser Leu
            100                 105                 110

Gln Gln Pro Ser Thr Gln Glu Tyr Val Leu His Val Tyr Glu His Leu
            115                 120                 125

Ser Lys Pro Lys Val Thr Met Gly Leu Gln Ser Asn Lys Asn Gly Thr
130                 135                 140

Cys Val Thr Asn Leu Thr Cys Cys Met Glu His Gly Glu Glu Asp Val
145                 150                 155                 160

Ile Tyr Thr Trp Lys Ala Leu Gly Gln Ala Ala Asn Glu Ser His Asn
            165                 170                 175

Gly Ser Ile Leu Pro Ile Ser Trp Arg Trp Gly Glu Ser Asp Met Thr
            180                 185                 190

Phe Ile Cys Val Ala Arg Asn Pro Val Ser Arg Asn Phe Ser Ser Pro
            195                 200                 205

Ile Leu Ala Arg Lys Leu Cys Glu Gly Ala Ala Asp Asp Pro Asp Ser
210                 215                 220

Ser Met Val Leu Leu Cys Leu Leu Val Pro Leu Leu Leu Ser Leu
225                 230                 235                 240

Phe Val Leu Gly Leu Phe Leu Trp Phe Leu Lys Arg Glu Arg Gln Glu
            245                 250                 255

Glu Tyr Ile Glu Glu Lys Lys Arg Val Asp Ile Cys Arg Glu Thr Pro
            260                 265                 270

Asn Ile Cys Pro His Ser Gly Glu Asn Thr Glu Tyr Asp Thr Ile Pro
            275                 280                 285

His Thr Asn Arg Thr Ile Leu Lys Glu Asp Pro Ala Asn Thr Val Tyr
            290                 295                 300

Ser Thr Val Glu Ile Pro Lys Lys Met Glu Asn Pro His Ser Leu Leu
305                 310                 315                 320

Thr Met Pro Asp Thr Pro Arg Leu Phe Ala Tyr Glu Asn Val Ile
            325                 330                 335

<210> SEQ ID NO 2
<211> LENGTH: 354
<212> TYPE: DNA
<213> ORGANISM: Mus musculus

<400> SEQUENCE: 2
gaggtgaagc tggtggagtc tgggggagcc ttagtgaagc tggagggtc cctgaaactc    60 gcctgtgctg cctctggatt cgctttcagc agctatgaca tgtcttgggt tcgccagact   120
ccggagaaga ggctggagtg ggtcgcaacc attagtagtg gtggtaggaa cacctactat   180
ccagacagtg tgaggggccg attcaccatc tccagagaca tgccagaaa cacctgtat    240 ctgcaaatga gcagtctgag gtctgaggac acggccttgt attactgtgc aacaagaaat   300
agtaactacg cctttgctta ttggggccaa gggactctgg tcactgtctc tgca         354

<210> SEQ ID NO 3
<211> LENGTH: 118
<212> TYPE: PRT
<213> ORGANISM: Mus musculus

<400> SEQUENCE: 3

```
Glu Val Lys Leu Val Glu Ser Gly Gly Ala Leu Val Lys Pro Gly Gly
1               5                   10                  15

Ser Leu Lys Leu Ala Cys Ala Ala Ser Gly Phe Ala Phe Ser Ser Tyr
                20                  25                  30

Asp Met Ser Trp Val Arg Gln Thr Pro Glu Lys Arg Leu Glu Trp Val
            35                  40                  45

Ala Thr Ile Ser Ser Gly Gly Arg Asn Thr Tyr Tyr Pro Asp Ser Val
        50                  55                  60

Arg Gly Arg Phe Thr Ile Ser Arg Asp Asn Ala Arg Asn Thr Leu Tyr
65                  70                  75                  80

Leu Gln Met Ser Ser Leu Arg Ser Glu Asp Thr Ala Leu Tyr Tyr Cys
                85                  90                  95

Ala Thr Arg Asn Ser Asn Tyr Ala Phe Ala Tyr Trp Gly Gln Gly Thr
            100                 105                 110

Leu Val Thr Val Ser Ala
        115
```

<210> SEQ ID NO 4
<211> LENGTH: 45
<212> TYPE: DNA
<213> ORGANISM: Artificial Sequence
<220> FEATURE:
<223> OTHER INFORMATION: synthetic

<400> SEQUENCE: 4
ggtggcggtg gttctggtgg cggtggttct ggtggcggtg gttct        45

<210> SEQ ID NO 5
<211> LENGTH: 15
<212> TYPE: PRT
<213> ORGANISM: Artificial Sequence
<220> FEATURE:
<223> OTHER INFORMATION: synthetic

<400> SEQUENCE: 5

```
Gly Gly Gly Gly Ser Gly Gly Gly Gly Ser Gly Gly Gly Gly Ser
1               5                   10                  15
```

<210> SEQ ID NO 6
<211> LENGTH: 324
<212> TYPE: DNA
<213> ORGANISM: Mus musculus

<400> SEQUENCE: 6
gacatcaaga tgacccagtc tccatcttcc atgtatgcat ctctaggaga gagagtcact        60
atcacttgca aggcaagtca ggacattaat atctatttaa actggttcca gcagagacca       120
gggaaatctc ctaagaccct gatctatcgt gcaaacagat tggttgacgg ggtcccagca       180
aggttcagtg gcagtggatc tgggcaagat ttttctctca ccatcaccag cctggaaatt       240
gaagatatgg gaatttatta ttgtctacag tttgatgagt ttccgctcac gttcggtgct       300
gggaccaagc tggagctgaa acgg                                              324

<210> SEQ ID NO 7
<211> LENGTH: 108
<212> TYPE: PRT
<213> ORGANISM: Mus musculus

<400> SEQUENCE: 7

Asp Ile Lys Met Thr Gln Ser Pro Ser Ser Met Tyr Ala Ser Leu Gly

```
1               5                   10                  15
Glu Arg Val Thr Ile Thr Cys Lys Ala Ser Gln Asp Ile Asn Ile Tyr
                20                  25                  30

Leu Asn Trp Phe Gln Gln Arg Pro Gly Lys Ser Pro Lys Thr Leu Ile
                35                  40                  45

Tyr Arg Ala Asn Arg Leu Val Asp Gly Val Pro Ala Arg Phe Ser Gly
                50                  55                  60

Ser Gly Ser Gly Gln Asp Phe Ser Leu Thr Ile Thr Ser Leu Glu Tyr
65                  70                  75                  80

Glu Asp Met Gly Ile Tyr Tyr Cys Leu Gln Phe Asp Glu Phe Pro Leu
                85                  90                  95

Thr Phe Gly Ala Gly Thr Lys Leu Glu Leu Lys Arg
                100                 105
```

<210> SEQ ID NO 8
<211> LENGTH: 241
<212> TYPE: PRT
<213> ORGANISM: Mus musculus

<400> SEQUENCE: 8

```
Glu Val Lys Leu Val Glu Ser Gly Gly Ala Leu Val Lys Pro Gly Gly
1               5                   10                  15

Ser Leu Lys Leu Ala Cys Ala Ala Ser Gly Phe Ala Phe Ser Ser Tyr
                20                  25                  30

Asp Met Ser Trp Val Arg Gln Thr Pro Glu Lys Arg Leu Glu Trp Val
                35                  40                  45

Ala Thr Ile Ser Ser Gly Gly Arg Asn Thr Tyr Tyr Pro Asp Ser Val
                50                  55                  60

Arg Gly Arg Phe Thr Ile Ser Arg Asp Asn Ala Arg Asn Thr Leu Tyr
65                  70                  75                  80

Leu Gln Met Ser Ser Leu Arg Ser Glu Asp Thr Ala Leu Tyr Tyr Cys
                85                  90                  95

Ala Thr Arg Asn Ser Asn Tyr Ala Phe Ala Tyr Trp Gly Gln Gly Thr
                100                 105                 110

Leu Val Thr Val Ser Ala Gly Gly Gly Ser Gly Gly Gly Ser
                115                 120                 125

Gly Gly Gly Gly Ser Asp Ile Lys Met Thr Gln Ser Pro Ser Ser Met
130                 135                 140

Tyr Ala Ser Leu Gly Glu Arg Val Thr Ile Thr Cys Lys Ala Ser Gln
145                 150                 155                 160

Asp Ile Asn Ile Tyr Leu Asn Trp Phe Gln Gln Arg Pro Gly Lys Ser
                165                 170                 175

Pro Lys Thr Leu Ile Tyr Arg Ala Asn Arg Leu Val Asp Gly Val Pro
                180                 185                 190

Ala Arg Phe Ser Gly Ser Gly Ser Gly Gln Asp Phe Ser Leu Thr Ile
                195                 200                 205

Thr Ser Leu Glu Tyr Glu Asp Met Gly Ile Tyr Tyr Cys Leu Gln Phe
                210                 215                 220

Asp Glu Phe Pro Leu Thr Phe Gly Ala Gly Thr Lys Leu Glu Leu Lys
225                 230                 235                 240

Arg
```

<210> SEQ ID NO 9
<211> LENGTH: 69
<212> TYPE: DNA

<213> ORGANISM: Homo sapiens

<400> SEQUENCE: 9

```
atggccttac cagtgaccgc cttgctcctg ccgctggcct tgctgctcca cgccgccagg    60
ccggctagc                                                           69
```

<210> SEQ ID NO 10
<211> LENGTH: 23
<212> TYPE: PRT
<213> ORGANISM: Homo sapiens

<400> SEQUENCE: 10

```
Met Ala Leu Pro Val Thr Ala Leu Leu Leu Pro Leu Ala Leu Leu Leu
1               5                   10                  15

His Ala Ala Arg Pro Ala Ser
            20
```

<210> SEQ ID NO 11
<211> LENGTH: 146
<212> TYPE: DNA
<213> ORGANISM: Homo sapiens

<400> SEQUENCE: 11

```
aagcccacca cgacgccagc gccgcgacca ccaacaccgg cgcccaccat cgcgtcgcag    60
ccctgtccc tgcgcccaga ggcgagccgg ccagcggcgg ggggcgcagt gcacacgagg   120
gggctggact tcgccagtga taagcc                                       146
```

<210> SEQ ID NO 12
<211> LENGTH: 49
<212> TYPE: PRT
<213> ORGANISM: Homo sapiens

<400> SEQUENCE: 12

```
Lys Pro Thr Thr Thr Pro Ala Pro Arg Pro Pro Thr Pro Ala Pro Thr
1               5                   10                  15

Ile Ala Ser Gln Pro Leu Ser Leu Arg Pro Glu Ala Ser Arg Pro Ala
            20                  25                  30

Ala Gly Gly Ala Val His Thr Arg Gly Leu Asp Phe Ala Ser Asp Lys
        35                  40                  45

Pro
```

<210> SEQ ID NO 13
<211> LENGTH: 81
<212> TYPE: DNA
<213> ORGANISM: Homo sapiens

<400> SEQUENCE: 13

```
ttttgggtgc tggtggtggt tggtggagtc ctggcttgct atagcttgct agtaacagtg    60
gcctttatta ttttctgggt g                                             81
```

<210> SEQ ID NO 14
<211> LENGTH: 27
<212> TYPE: PRT
<213> ORGANISM: Homo sapiens

<400> SEQUENCE: 14

```
Phe Trp Val Leu Val Val Val Gly Gly Val Leu Ala Cys Tyr Ser Leu
1               5                   10                  15

Leu Val Thr Val Ala Phe Ile Ile Phe Trp Val
```

20                  25

<210> SEQ ID NO 15
<211> LENGTH: 123
<212> TYPE: DNA
<213> ORGANISM: Homo sapiens

<400> SEQUENCE: 15
aggagtaaga ggagcaggct cctgcacagt gactacatga acatgactcc ccgccgcccc    60
gggcccaccc gcaagcatta ccagccctat gccccaccac gcgacttcgc agcctatcgc   120
tcc                                                                 123

<210> SEQ ID NO 16
<211> LENGTH: 41
<212> TYPE: PRT
<213> ORGANISM: Homo sapiens

<400> SEQUENCE: 16

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40

<210> SEQ ID NO 17
<211> LENGTH: 342
<212> TYPE: DNA
<213> ORGANISM: Homo sapiens

<400> SEQUENCE: 17
agagtgaagt tcagcaggag cgcagacgcc cccgcgtacc agcagggcca gaaccagctc    60
tataacgagc tcaatctagg acgaagagag gagtacgatg ttttggacaa gagacgtggc   120
cgggaccctg agatgggggg aaagccgaga aggaagaacc ctcaggaagg cctgtacaat   180
gaactgcaga aagataagat ggcggaggcc tacagtgaga ttgggatgaa aggcgagcgc   240
cggaggggca aggggcacga tggcctttac cagggtctca gtacagccac caaggacacc   300
tacgacgccc ttcacatgca ggccctgccc cctcgctaat ag                      342

<210> SEQ ID NO 18
<211> LENGTH: 112
<212> TYPE: PRT
<213> ORGANISM: Homo sapiens

<400> SEQUENCE: 18

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 19
<211> LENGTH: 1491
<212> TYPE: DNA
<213> ORGANISM: Homo sapiens

<400> SEQUENCE: 19

| | | | | |
|---|---|---|---|---|
| atggccttac | cagtgaccgc | cttgctcctg | ccgctggcct | tgctgctcca | cgccgccagg | 60 |
| ccggctagcg | aggtgaagct | ggtggagtct | gggggagcct | tagtgaagcc | tggagggtcc | 120 |
| ctgaaactcg | cctgtgctgc | ctctggattc | gctttcagca | gctatgacat | gtcttgggtt | 180 |
| cgccagactc | cggagaagag | gctggagtgg | gtcgcaacca | ttagtagtgg | tggtaggaac | 240 |
| acctactatc | cagacagtgt | gaggggccga | ttcaccatct | ccagagacaa | tgccagaaac | 300 |
| accctgtatc | tgcaaatgag | cagtctgagg | tctgaggaca | cggccttgta | ttactgtgca | 360 |
| acaagaaata | gtaactacgc | ctttgcttat | tggggccaag | ggactctggt | cactgtctct | 420 |
| gcaggtggcg | gtggttctgg | tggcggtggt | tctggtggcg | gtggttctga | catcaagatg | 480 |
| acccagtctc | catcttccat | gtatgcatct | ctaggagaga | gagtcactat | cacttgcaag | 540 |
| gcaagtcagg | acattaatat | ctatttaaac | tggttccagc | agagaccagg | gaaatctcct | 600 |
| aagaccctga | tctatcgtgc | aaacagattg | gttgacgggg | tcccagcaag | gttcagtggc | 660 |
| agtggatctg | gcaagatttt | tctctcacc | atcaccagcc | tggaatatga | agatatggga | 720 |
| atttattatt | gtctacagtt | tgatgagttt | ccgctcacgt | tcggtgctgg | gaccaagctg | 780 |
| gagctgaaac | ggctcgagaa | gcccaccacg | acgccagcgc | cgcgaccacc | aacaccggcg | 840 |
| cccaccatcg | cgtcgcagcc | cctgtccctg | cgcccagagg | cgagccggcc | agcggcgggg | 900 |
| ggcgcagtgc | acacgagggg | gctggacttc | gccagtgata | gcccttttg | ggtgctggtg | 960 |
| gtggttggtg | gagtcctggc | ttgctatagc | ttgctagtaa | cagtggcctt | tattattttc | 1020 |
| tgggtgagga | gtaagaggag | caggctcctg | cacagtgact | acatgaacat | gactccccgc | 1080 |
| cgccccgggc | ccacccgcaa | gcattaccag | ccctatgccc | caccgcgcga | cttcgcagcc | 1140 |
| tatcgctcca | gagtgaagtt | cagcaggagc | gcagacgccc | ccgcgtacca | gcagggccag | 1200 |
| aaccagctct | ataacgagct | caatctagga | cgaagagagg | agtacgatgt | tttggacaag | 1260 |
| agacgtggcc | gggaccctga | gatggggggga | aagccgcaga | gaaggaagaa | ccctcaggaa | 1320 |
| ggcctgtaca | atgaactgca | gaaagataag | atggcggagg | cctacagtga | gattgggatg | 1380 |
| aaaggcgagc | gccggagggg | caaggggcac | gatggccttt | accagggtct | cagtacagcc | 1440 |
| accaaggaca | cctacgacgc | ccttcacatg | caggccctgc | cccctcgcta | a | 1491 |

<210> SEQ ID NO 20
<211> LENGTH: 496
<212> TYPE: PRT
<213> ORGANISM: Homo sapiens

<400> SEQUENCE: 20

Met Ala Leu Pro Val Thr Ala Leu Leu Leu Pro Leu Ala Leu Leu Leu
1               5                   10                  15

His Ala Ala Arg Pro Ala Ser Glu Val Lys Leu Val Glu Ser Gly Gly
                20                  25                  30

Ala Leu Val Lys Pro Gly Gly Ser Leu Lys Leu Ala Cys Ala Ala Ser
            35                  40                  45

Gly Phe Ala Phe Ser Ser Tyr Asp Met Ser Trp Val Arg Gln Thr Pro

```
             50                  55                  60
Glu Lys Arg Leu Glu Trp Val Ala Thr Ile Ser Ser Gly Gly Arg Asn
 65                  70                  75                  80

Thr Tyr Tyr Pro Asp Ser Val Arg Gly Arg Phe Thr Ile Ser Arg Asp
                 85                  90                  95

Asn Ala Arg Asn Thr Leu Tyr Leu Gln Met Ser Ser Leu Arg Ser Glu
                100                 105                 110

Asp Thr Ala Leu Tyr Tyr Cys Ala Thr Arg Asn Ser Asn Tyr Ala Phe
                115                 120                 125

Ala Tyr Trp Gly Gln Gly Thr Leu Val Thr Val Ser Ala Gly Gly Gly
                130                 135                 140

Gly Ser Gly Gly Gly Gly Ser Gly Gly Gly Gly Ser Asp Ile Lys Met
145                 150                 155                 160

Thr Gln Ser Pro Ser Ser Met Tyr Ala Ser Leu Gly Glu Arg Val Thr
                165                 170                 175

Ile Thr Cys Lys Ala Ser Gln Asp Ile Asn Ile Tyr Leu Asn Trp Phe
                180                 185                 190

Gln Gln Arg Pro Gly Lys Ser Pro Lys Thr Leu Ile Tyr Arg Ala Asn
                195                 200                 205

Arg Leu Val Asp Gly Val Pro Ala Arg Phe Ser Gly Ser Gly Ser Gly
210                 215                 220

Gln Asp Phe Ser Leu Thr Ile Thr Ser Leu Glu Tyr Glu Asp Met Gly
225                 230                 235                 240

Ile Tyr Tyr Cys Leu Gln Phe Asp Glu Phe Pro Leu Thr Phe Gly Ala
                245                 250                 255

Gly Thr Lys Leu Glu Leu Lys Arg Leu Glu Lys Pro Thr Thr Thr Pro
                260                 265                 270

Ala Pro Arg Pro Pro Thr Pro Ala Pro Thr Ile Ala Ser Gln Pro Leu
                275                 280                 285

Ser Leu Arg Pro Glu Ala Ser Arg Pro Ala Ala Gly Gly Ala Val His
                290                 295                 300

Thr Arg Gly Leu Asp Phe Ala Ser Asp Lys Pro Phe Trp Val Leu Val
305                 310                 315                 320

Val Val Gly Gly Val Leu Ala Cys Tyr Ser Leu Leu Val Thr Val Ala
                325                 330                 335

Phe Ile Ile Phe Trp Val Arg Ser Lys Arg Ser Arg Leu Leu His Ser
                340                 345                 350

Asp Tyr Met Asn Met Thr Pro Arg Arg Pro Gly Pro Thr Arg Lys His
                355                 360                 365

Tyr Gln Pro Tyr Ala Pro Pro Arg Asp Phe Ala Ala Tyr Arg Ser Arg
                370                 375                 380

Val Lys Phe Ser Arg Ser Ala Asp Ala Pro Ala Tyr Gln Gln Gly Gln
385                 390                 395                 400

Asn Gln Leu Tyr Asn Glu Leu Asn Leu Gly Arg Arg Glu Glu Tyr Asp
                405                 410                 415

Val Leu Asp Lys Arg Arg Gly Arg Asp Pro Glu Met Gly Gly Lys Pro
                420                 425                 430

Gln Arg Arg Lys Asn Pro Gln Glu Gly Leu Tyr Asn Glu Leu Gln Lys
                435                 440                 445

Asp Lys Met Ala Glu Ala Tyr Ser Glu Ile Gly Met Lys Gly Glu Arg
                450                 455                 460

Arg Arg Gly Lys Gly His Asp Gly Leu Tyr Gln Gly Leu Ser Thr Ala
465                 470                 475                 480
```

Thr Lys Asp Thr Tyr Asp Ala Leu His Met Gln Ala Leu Pro Pro Arg
            485                 490                 495

<210> SEQ ID NO 21
<211> LENGTH: 1494
<212> TYPE: DNA
<213> ORGANISM: Homo sapiens

<400> SEQUENCE: 21

```
atggccttac cagtgaccgc cttgctcctg ccgctggcct tgctgctcca cgccgccagg      60
ccggctagcg aggtgaagct ggtggagtct gggggagcct tagtgaagcc tggagggtcc     120
ctgaaactcg cctgtgctgc ctctggattc gctttcagca gctatgacat gtcttgggtt     180
cgccagactc cggagaagag gctggagtgg gtcgcaacca ttagtagtgg tggtaggaac     240
acctactatc agacagtgt gaggggccga ttcaccatct ccagagacaa tgccagaaac     300
accctgtatc tgcaaatgag cagtctgagg tctgaggaca cggccttgta ttactgtgca     360
acaagaaata gtaactacgc ctttgcttat tggggccaag ggactctggt cactgtctct     420
gcaggtggcg gtggttctgg tggcggtggt tctggtggcg gtggttctga catcaagatg     480
acccagtctc catcttccat gtatgcatct ctaggagaga gagtcactat cacttgcaag     540
gcaagtcagg acattaatat ctatttaaac tggttccagc agagaccagg gaaatctcct     600
aagaccctga tctatcgtgc aaacagattg gttgacgggg tcccagcaag gttcagtggc     660
agtggatctg gcaagatttt tctctcacc atcaccagcc tggaatatga agatatggga     720
atttattatt gtctacagtt tgatgagttt ccgctcacgt tcggtgctgg gaccaagctg     780
gagctgaaac ggctcgagaa gcccaccacg acgccagcgc cgcgaccacc aacaccggcg     840
cccaccatcg cgtcgcagcc cctgtccctg cgcccagagg cgagccggcc agcggcgggg     900
ggcgcagtgc acacgagggg gctggacttc gccagtgata gcccttttg ggtgctggtg     960
gtggttggtg gagtcctggc ttgctatagc ttgctagtaa cagtggcctt tattattttc    1020
tgggtgaaac ggggcagaaa gaaactcctg tatatattca acaaccatt tatgagacca    1080
gtacaaacta ctcaagagga agatggctgt agctgccgat tccagaagag aagaaggag    1140
ggatgtgaac tgagagtgaa gttcagcagg agcgcagacg ccccgcgta ccagcagggc    1200
cagaaccagc tctataacga gctcaatcta ggacgaagag aggagtacga tgttttggac    1260
aagagacgtg gccgggaccc tgagatgggg ggaaagccgc agagaaggaa gaaccctcag    1320
gaaggcctgt acaatgaact gcagaaagat aagatggcgg aggcctacag tgagattggg    1380
atgaaaggcg agcgccggag gggcaagggg cacgatggcc tttaccaggg tctcagtaca    1440
gccaccaagg acacctacga cgcccttcac atgcaggccc tgcccctcg ctaa          1494
```

<210> SEQ ID NO 22
<211> LENGTH: 497
<212> TYPE: PRT
<213> ORGANISM: Homo sapiens

<400> SEQUENCE: 22

Met Ala Leu Pro Val Thr Ala Leu Leu Leu Pro Leu Ala Leu Leu
1               5                   10                  15

His Ala Ala Arg Pro Ala Ser Glu Val Lys Leu Val Glu Ser Gly Gly
            20                  25                  30

Ala Leu Val Lys Pro Gly Gly Ser Leu Lys Leu Ala Cys Ala Ala Ser
        35                  40                  45

-continued

Gly Phe Ala Phe Ser Ser Tyr Asp Met Ser Trp Val Arg Gln Thr Pro
 50                  55                  60

Glu Lys Arg Leu Glu Trp Val Ala Thr Ile Ser Ser Gly Gly Arg Asn
 65                  70                  75                  80

Thr Tyr Tyr Pro Asp Ser Val Arg Gly Arg Phe Thr Ile Ser Arg Asp
                 85                  90                  95

Asn Ala Arg Asn Thr Leu Tyr Leu Gln Met Ser Ser Leu Arg Ser Glu
                100                 105                 110

Asp Thr Ala Leu Tyr Tyr Cys Ala Thr Arg Asn Ser Asn Tyr Ala Phe
            115                 120                 125

Ala Tyr Trp Gly Gln Gly Thr Leu Val Thr Val Ser Ala Gly Gly Gly
130                 135                 140

Gly Ser Gly Gly Gly Gly Ser Gly Gly Gly Gly Ser Asp Ile Lys Met
145                 150                 155                 160

Thr Gln Ser Pro Ser Ser Met Tyr Ala Ser Leu Gly Glu Arg Val Thr
                165                 170                 175

Ile Thr Cys Lys Ala Ser Gln Asp Ile Asn Ile Tyr Leu Asn Trp Phe
            180                 185                 190

Gln Gln Arg Pro Gly Lys Ser Pro Lys Thr Leu Ile Tyr Arg Ala Asn
        195                 200                 205

Arg Leu Val Asp Gly Val Pro Ala Arg Phe Ser Gly Ser Gly Ser Gly
210                 215                 220

Gln Asp Phe Ser Leu Thr Ile Thr Ser Leu Glu Tyr Glu Asp Met Gly
225                 230                 235                 240

Ile Tyr Tyr Cys Leu Gln Phe Asp Glu Phe Pro Leu Thr Phe Gly Ala
                245                 250                 255

Gly Thr Lys Leu Glu Leu Lys Arg Leu Glu Lys Pro Thr Thr Thr Pro
            260                 265                 270

Ala Pro Arg Pro Pro Thr Pro Ala Pro Thr Ile Ala Ser Gln Pro Leu
        275                 280                 285

Ser Leu Arg Pro Glu Ala Ser Arg Pro Ala Ala Gly Gly Ala Val His
        290                 295                 300

Thr Arg Gly Leu Asp Phe Ala Ser Asp Lys Pro Phe Trp Val Leu Val
305                 310                 315                 320

Val Val Gly Gly Val Leu Ala Cys Tyr Ser Leu Leu Val Thr Val Ala
                325                 330                 335

Phe Ile Ile Phe Trp Val Lys Arg Gly Arg Lys Lys Leu Leu Tyr Ile
            340                 345                 350

Phe Lys Gln Pro Phe Met Arg Pro Val Gln Thr Thr Gln Glu Glu Asp
        355                 360                 365

Gly Cys Ser Cys Arg Phe Pro Glu Glu Glu Glu Gly Gly Cys Glu Leu
370                 375                 380

Arg Val Lys Phe Ser Arg Ser Ala Asp Ala Pro Ala Tyr Gln Gln Gly
385                 390                 395                 400

Gln Asn Gln Leu Tyr Asn Glu Leu Asn Leu Gly Arg Arg Glu Glu Tyr
                405                 410                 415

Asp Val Leu Asp Lys Arg Arg Gly Arg Asp Pro Glu Met Gly Gly Lys
            420                 425                 430

Pro Gln Arg Arg Lys Asn Pro Gln Glu Gly Leu Tyr Asn Glu Leu Gln
        435                 440                 445

Lys Asp Lys Met Ala Glu Ala Tyr Ser Glu Ile Gly Met Lys Gly Glu
450                 455                 460

Arg Arg Arg Gly Lys Gly His Asp Gly Leu Tyr Gln Gly Leu Ser Thr

```
465                 470                 475                 480
Ala Thr Lys Asp Thr Tyr Asp Ala Leu His Met Gln Ala Leu Pro Pro
                485                 490                 495
Arg

<210> SEQ ID NO 23
<211> LENGTH: 126
<212> TYPE: DNA
<213> ORGANISM: Homo sapiens

<400> SEQUENCE: 23
aaacggggca gaaagaaact cctgtatata ttcaaacaac catttatgag accagtacaa      60
actactcaag aggaagatgg ctgtagctgc cgatttccag aagaagaaga aggaggatgt     120
gaactg                                                               126

<210> SEQ ID NO 24
<211> LENGTH: 42
<212> TYPE: PRT
<213> ORGANISM: Homo sapiens

<400> SEQUENCE: 24

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40
```